4a. ALLOY NO. 839
0.02 % TIN

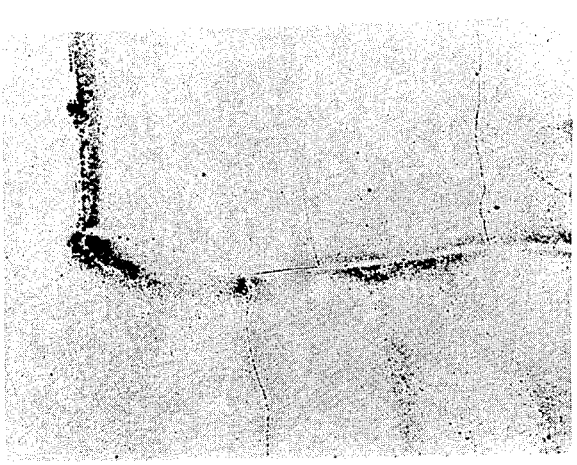

NARROW WIDTH OF HIGHER TIN CONCENTRATION (DARKER AREAS) NEAR GRAIN BOUNDARIES RESULTS IN MORE INTENSIVE INTERGRANULAR CORROSION.

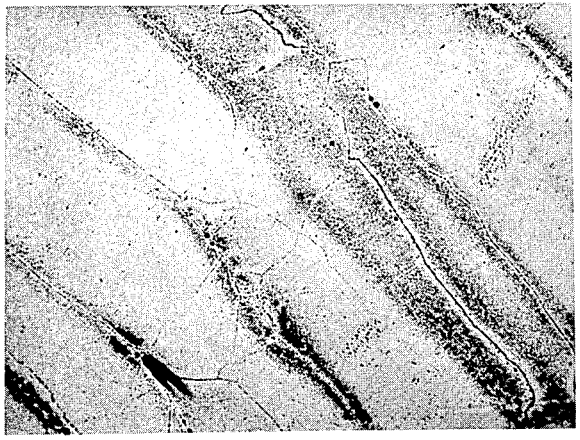

4b. ALLOY NO. 841
0.08 % TIN

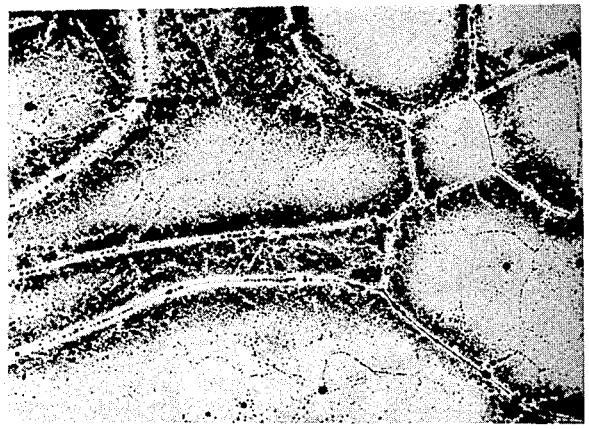

4c. ALLOY NO. 842
0.12 % TIN

BROAD WIDTH OF HIGH TIN CONCENTRATION AROUND GRAIN BOUNDARIES RESULTS IN LESS INTENSIVE INTERGRANULAR CORROSION.

FIG-4

*INVENTOR.*
MICHAEL J. PRYOR
DOUGLAS S. KEIR
PHILIP R. SPERRY
BY Paul E. Rockford April 27, 1965     M. J. PRYOR ETAL     3,180,728
ALUMINUM-TIN COMPOSITION
Filed Oct. 3, 1960     10 Sheets-Sheet 5

RELATION BETWEEN NUMBER OF COULOMBS FLOWING IN 48 HOURS FROM SPECIMENS AT DIFFERENT LOCATIONS AND COOLING RATE OF AS-CAST Al-Sn ANODES.

INVENTORS.
MICHAEL J. PRYOR
DOUGLAS S KEIR
PHILIP R. SPERRY
BY

April 27, 1965  M. J. PRYOR ET AL  3,180,728
ALUMINUM-TIN COMPOSITION
Filed Oct. 3, 1960  10 Sheets-Sheet 7

INVENTORS.
MICHAEL J. PRYOR
DOUGLAS S. KEIR
PHILIP R. SPERRY

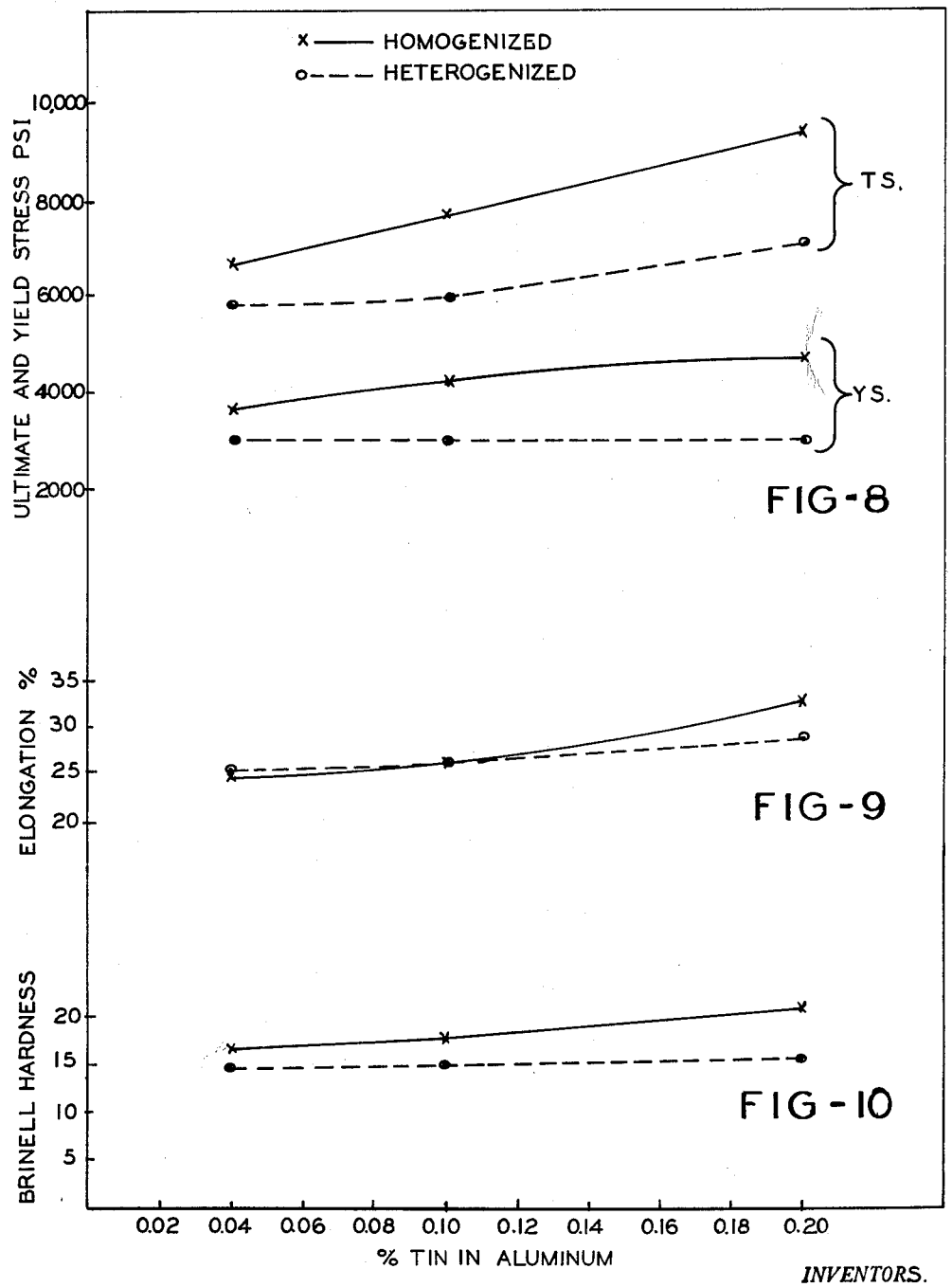

United States Patent Office 3,180,728
Patented Apr. 27, 1965

3,180,728
ALUMINUM-TIN COMPOSITION
Michael J. Pryor and Douglas S. Keir, both of Hamden, and Philip R. Sperry, North Haven, Conn., assignors to Olin Mathieson Chemical Corporation, a corporation of Virginia
Filed Oct. 3, 1960, Ser. No. 60,166
5 Claims. (Cl. 75—138)

The present invention relates to novel compositions containing aluminum and to methods of preparing these compositions. More particularly it relates to aluminum alloys containing a relatively low percentage of tin, to methods of preparing the compositions to impart desirable galvanic properties thereto, and to methods and apparatus for making use of these galvanic properties.

A problem which has been recognized for a long time in the art of use of metals in galvanic applications is that of providing a low cost, commercially available metal in a form which has desirable galvanic properties for many uses. Numerous metals and alloys have been proposed for these purposes and a number of metal compositions have been found to have galvanic properties which make them suitable for particular applications. The degree of utility which is found for a particular metal depends, of course, on the combination of galvanic properties required for a specific use and on how well this combination of properties can be met by lower cost metals and alloys.

One distinct advantage of the metal alloy system of this invention is that it may be treated to render it capable of exhibiting any of a wide variety of combinations of galvanic behavior. Thus alloy specimens may be formed which can yield very high galvanic currents, high anodic efficiencies, a capability for uniform surface corrosion combined with high anodic efficiency and high current and other combinations as pointed out more fully hereinafter. Moreover, although the improved galvanic properties are subject to wide adjustment, any particular desired values within the range of values attainable for the system can be attained reliably and reproducibly.

Alloys containing high percentages of tin in aluminum have been known and studied for many years and various values have been reported for the solubility of tin in aluminum and for the solubility of aluminum in tin. However, none of the known alloys of tin and aluminum which have been known have been shown to exhibit a combination of galvanic properties such as those produced pursuant to the present methods.

Aluminum compositions containing large amounts of tin have been used, for example, as bearing alloys. Other aluminum alloy compositions have been used in which small tin additions have been utilized as for example in Al-Cu base alloys to modify rates of age hardening.

Accordingly, one object of the present invention is to provide an alloy of aluminum which exhibits improved galvanic behavior.

Another object is to provide a method of imparting improved galvanic properties to aluminum.

A further object is to provide a method of controlling the galvanic properties of alloys of aluminum and tin.

Still another object is to provide an alloy having a combination of galvanic properties which are variable over a wide range not currently attainable in commercially available alloys.

An additional object is to provide an alloy of aluminum having a low resistance oxide layer formed on the surface thereof.

Another object is to provide a method of forming a film on aluminum having a low electrical resistance.

A further object of the invention is to provide an alloy of aluminum which has improved galvanic properties and which can be prepared by casting directly from the molten state.

Another object is to teach a method of preparing an aluminum composition having these improved galvanic properties directly from the molten state.

Other objects will be in part apparent and in part pointed out in the description which follows.

In one of its broader aspects the objects of the invention are achieved by increasing the conductivity of a surface layer formed on aluminum by more than 100%, by including in a composition containing aluminum, an ingredient which on reaction of said composition with the environment will introduce "n" type defects into the surface layer formed on said aluminum.

The manner of carrying out the invention and the advantages achieved will be made clear from the detailed description and illustrations given below. However an explanation of the purpose and effect of increasing the n-type defects will be helpful in a fuller understanding of the many advantageous results which can be obtained by practice of the invention. Accordingly the following explanation is offered for this purpose although the validity of the invention is not to be understood as dependent on the accuracy of the explanation which is given.

Thin films of oxide formed on aluminum during contact with the atmosphere have a poorly-crystalline pseudo-spinel structure. These films have a high electrical resistance and are "n" type semiconductors as this term is commonly used in the solid state physics art. Under environmental conditions where these thin films are stable, their high electrical resistance results in the films conferring a high degree of protection against oxidation, atmospheric tarnishing, aqueous corrosion and other environmental reaction. Consequently wrought aluminum alloys have been widely used as corrosion resistant construction materials in heavy industrial applications and particularly in marine environments.

Stable high resistance natural aluminum oxide films have tended to prevent the full exploitation of aluminum and its present commercial alloys as sacrificial anodes for the cathodic protection of dissimilar metal structures in marine and other corrosive environments. In such case the high electrical resistance of the oxide film results in severe polarization of the aluminum and consequent resistance to the flow of a protective current. It has now been found that a deliberate creation of more "n" type defects in a protective surface film on aluminum, such as an oxide film, can increase proportionately the number of current carriers and can thereby reduce the electrical resistance of the films together with the related anodic polarization effects.

There are two principal methods which are used in practicing the present invention to produce surface layers containing an increased number of "n" type defects on a composition sufficient to effect a significant lowering of the resistance of a film formed on the composition by continuous reaction of the surface of the aluminum composition with the environment. In both methods the origin of a major portion of the "n" type defects must be from within the composition on which the film is formed. The first such method is that of including within the composition components which will result in a distribution within the surface layer of cations of higher valency than that of aluminum. The second method is that of including in the composition components which will cause a distribution within the surface layer of anions of lower valency than the anions from which the layer is formed.

It is within the scope of the present invention to practice the first method by including certain alloying additives in a metal composition composed predominantly of aluminum and on which a surface film is to be formed by reaction with the environment, which additives, or reaction products thereof, will be continuously distributed through the surface film to produce "n" type defects of a kind and number which will cause resistance of the surface film to be very greatly reduced.

In the case of the reaction of the aluminum composition with an environment containing available or reactive oxygen, this incorporation of certain metals in the aluminum composition by alloying of the base metal, permits natural oxide containing metallic cations of higher valency than aluminum to form spontaneously and automatically on any surface of the composition as it becomes exposed to the oxygen. In order for metallic cations from the alloy composition to enter the oxide film cation lattice, it is necessary for the alloying element to be in either a stable or metastable solid solution in the aluminum metal. Furthermore, the alloying element itself must be capable of forming an oxide in the reaction environment, i.e., it must not be an excessively noble metal, as otherwise it will enter the aluminum lattice only with great difficulty. Tin has been found to be a particularly effective alloying additive for use in practicing the methods and forming compositions of the present invention.

With particular regard now to the introduction of tin cations into alumina films formed on the surface of an aluminum composition exposed to available oxygen, if this is to be done on a continuous basis as an alumina coated metal body takes part in an electrolytic process, such as a sacrificial anode dissolution, the pin present in the metal body must continuously replace that associated with the alumina film as the aluminum metal effectively passes continuously through the film, and as the film moves progressively into the metal body.

Accordingly, tin present in the aluminum metal body must be present not only in a concentration required to supply the needed tin, it must also be present in a form which will result in continuous formation of n-type tin defects, as well as in the required number and array of defects within the layer, to impart the necessary increased conductivity to the surface layer or film.

In addition to the increased number of n-type defects required for increased conductivity of a surface layer formed by environmental reaction, additional requirements exist where the composition is to exhibit improved galvanic properties such as improved sacrificial anode properties and these requirements as well as the relationships between the requirements and advantages of the methods and compositions will be discussed below.

Some of the overall advantages achievable through use of three of the alloy compositions of the present invention in marine or other sacrificial anode applications will be evident from a comparison of the values of galvanic performance characteristics of certain compositions of this aluminum-tin system with those of other metals in common use as sacrificial anodes. The comparative values are included in Table I below.

TABLE I

*Comparative galvanic performance characteristics of cast-homogenized Al-Sn alloy containing 0.10 to 0.15% tin*

| Metal | Coulombs delivered in 48 hrs. to a 10 sq. cm. steel cathode in 100 ml. of 0.1 N NaCl at 25° C. | Type of corrosion | Ampere hours per pound | Anodic efficiency |
|---|---|---|---|---|
| Al-0.10% Sn | 520 | Uniform (plus some shallow pitting). | 950 | 70%. |
| Al-0.125% Sn | 950 | Uniform | 785 | 58%. |
| Al-0.15% Sn | 1,000 | do | 690 | 51%. |
| Magnesium | Approx. 90 | do | 500 | Approx. 50%. |
| High purity Zinc | 15 | do | 250 | 60-70%. |
| High purity Al | 8-10 | do | 1,100 | 85-90%. |

From the values given in Table I and from other data given below, it will be evident that no single factor is controlling in the relative merit of metals for use in marine sacrificial anode systems. Rather it is the combination of the relatively high current and efficiency values, the high ampere hour per pound values together with considerations of lower cost of the aluminum-tin alloys which give them such distinctly improved capabilities for sacrificial anode applications.

Furthermore, it will be appreciated from the values given in Table I for the three aluminum-tin alloy compositions listed, as well as from other compositions discussed below, that the system disclosed herein is uniquely adaptable to supply galvanic currents of a wide variety of current densities, anodic efficiencies, and other related characteristics. It is this adjustability, based both on differences in tin content, and on thermal and other conditioning of the metal, which makes the alloys and methods of the present invention a unique departure from previous metallurgy related to improving galvanic properties of alloys.

As indicated above the invention is practiced by imparting to a surface layer formed on aluminum by environmental reaction a conductivity far above that normally achieved. A general explanation of how the invention is practiced, and a specific illustration of the advantages obtainable when aluminum-tin compositions are formed in practicing the invention were given with particular reference to sacrificial anode uses. In order to provide a more detailed explanation of the practice of the invention with a number of materials of which tin is illustrative, the following definitions are given for convenience and clarity of reference.

As used in these examples the term "reference homogenization," "reference homogenizing heat treatment" and the like, means that the aluminum-tin sample so treated was suspended in a circulating air furnace heated to a temperature of 620° C. and held within three degrees above or below this temperature for 16 hours. At the end of this heating period it is quenched by immersion in a large volume of water, relative to the volume of the specimen, at ambient temperature. The term "homogenization treatment" is intended to mean a thermal treatment of an aluminum tin alloy which will maximize the uniform distribution of tin in the alloy and will provide specimens having the maximum amount of retained tin in a metastable solid solution. In general usage the homogenization term is used to indicate a treatment to maximize the portion of an alloying element which is in metastable solid solution in an aluminum composition.

The terms "galvanic current," "galvanic corrosion current" and similar terms, as used herein, mean the number of coulombs delivered from a uniform reference surface area of an aluminum alloy composition electrode (usually 10 square centimeters) to a like area of steel in unit time as all essential conditions governing galvanic behavior, except those specifically under study, are held constant.

The phrase "level of current output" is used herein to indicate on a comparative basis, the value in coulombs of the galvanic current delivered from an anode of reference surface area to a cathode of reference surface, per second, under standardized conditions, and through a reference electrolytic cell. The usual value given in the examples herein is the number of coulombs delivered in 48 hours from a 10 sq. cm. Al-Sn anode to a 10 sq. cm. steel cathode in a standard electrolytic cell containing 0.1 normal NaCl at 25° C. The reference cell used in these determinations is the same in all essential respects as that described in the Journal of the Electrochemical Society, volume 105, starting at page 629.

The term "heterogenizing," "heterogenized alloy," and the like, refers to a treatment of an aluminum-tin composition in which tin is in metastable solution at a given concentration level, to lower the concentration level and to transform at least a portion of the tin solute into a second phase state. A reference heterogenization treatment used in the examples below involved 24 hour heating at 400° C. followed by a water quench.

As used herein the term "cast" and "as-cast" have their conventional meanings and indicate that the metal specimen has received no thermal or other treatment subsequent to being solidified from the molten state.

The terms "anodic efficiency," "current efficiency," and like terms, as used herein means the weight ratio of metal theoretically needed to produce one faraday, to the actual weight of the metal found to be necessary to produce the current. This weight ratio is usually multiplied by 100 and expressed as a percentage efficiency value.

With the foregoing definitions available for reference, consideration is now given to the advantages made possible by formation and use of certain aluminum-tin alloys pursuant to this invention.

A first requirement of aluminum-tin alloy compositions which are to be used as marine sacrificial anodes in accordance with this invention is that indicated above, namely, that they contain a substantial quantity of tin in a form available for the formation of a much higher number of "n" type defects than are normally present in aluminum oxide. For this purpose an aluminum-tin composition may be prepared to contain a concentration of tin in solution equivalent to or less than the saturation solubility concentration of tin at the temperature of maximum solubility. Substantially all of this tin may then be brought into a state of solid solution by the reference homogenization treatment if it is not so dissolved when the alloy is formed. When in this form the alloy is suitable for use in general sacrificial anode purposes, including marine sacrificial anodes, and for numerous other purposes.

In general the anodic efficiency of the metal composition containing only tin in solid solution in high purity aluminum is high and may be of the order of 90% or more when electrically coupled to a steel cathode both through an external electrical circuit and through an internal saline electrolyte circuit.

However, where an alloy composition containing a maximum of dissolved tin is used, although the efficiency is high, this high efficiency is accompanied by an undesirable pitting. This pitting is an undesirable localized penetration of the metal at a rate greater than that which would result in uniform corrosion of the entire anode. Pitting may ultimately lead to portions of the electrode becoming detached where the electrode is used for an extended term, and to a lowering of the value of ampere hours per pound obtained for the metal of the anode.

It has now been discovered that by addition of a second phase conducting local cathode, numerous corrosion sites can be produced, and that through the production of numerous corrosion sites a desirable uniform corrosion occurs. It has further been discovered that although the addition of the second phase cathode is accompanied by a loss of efficiency, a sacrificial anode composition can be prepared which has a combination of galvanic properties, as indicated in Table I, which are better than those of other metals.

As an additional unexpected advantage of the addition of the conductive secondary cathode particles, an increase is found in the amount of current produced at the anode. Thus, for example, the values listed in Table I show that where the efficiency decreased from 70% to 58%, as the percent tin increased from 0.10 to 0.125, the galvanic current increased quite surprisingly by 83%.

Accordingly a second requirement of compositions of the present invention, when put to galvanic uses such as sacrificial anode uses, over and above the requirement for an increased number of n-type defects in the surface layer formed by anionic reactions, is the requirement for the presence of particulate secondary cathodes in the anode. In essence the second requirement is that the secondary cathode be of such form, composition and distribution within the anode as to cause significant changes in the other factors governing the galvanic properties of the composition.

Thus it has been found that where a second phase conductive substance, insoluble both in aluminum base alloy and in the electrolytes, is added to the aluminum-tin anode as a finely divided dispersed particulate material, the second phase substance acts as a cathode.

There is a definite relationship between the form and quantity of the second phase cathode particles and the galvanic properties exhibited by an anode in which they are distributed as will be brought out more fully below. However, in general either too many or too few of the cathode particles, or particles which are too big or too small, will not give the desired results.

It will be appreciated that the second phase particles become active as secondary cathodes only as the particles become exposed to the electrolyte environment at the surface of the anode during the electrolytic dissolution of the anode metal.

The term local action corrosion refers herein to the corrosion which takes place in the vicinity of particulate tin, or other second phase cathode particle, at the surface of the sacrificial anode.

Because of the intimate contact and close juxtaposition of the second phase cathodes with and to the surface of a sacrificial anode, the anode efficiency is very sensitive to the quantity and distribution of the second phase cathode particulate material in the sacrificial anode.

For the sacrificial anode applications in 0.1 N NaCl as described below, it has been found that in an alloy in which there is a distribution of essentially elemental excess tin in particulate form, and in which the number and distribution of particles is sufficient to provide a statically significant sample, the efficiency of the anodic current, E, is related to a number of other variables in the galvanic process according to the following equation:

$$\text{percent } E = 100 - \frac{m}{ks}\left(1 + \frac{2d}{r'}\right)$$

wherein

E is the anodic efficiency in percentage,
m is the mass of excess tin and other conductive solid second phase per unit volume,
s is the density of the metal in second phase,
K is a constant,
d is the depth of corrosion per unit time, and
r' is the average radius of the second phase particles taken on the basis that the particles are essentially spherical.

The foregoing equation provides a basis on which many adjustments can be made in the operation of a sacrificial anode composed of a solution of tin in high purity aluminum, and having an excess of tin present in a second phase as essentially elemental tin.

As an illustration, if the aluminum composition which gives satisfactorily high anode efficiency in 0.1 N NaCl solution, is used in a liquid medium containing an ion, such as fluoride ion, in a form which will produce a greater depth of corrosion, d, and a consequent lowering of the efficiency, E, this efficiency loss can be offset by changing the anode composition as, for example, by reducing the mass fraction, m, or by increasing the particle size, or by partial changes in both of these.

Similarly where the particular ionic content of an electrolyte system brought into contact with the aluminum-tin composition as a sacrificial anode is such that the depth of corrosion, d, is lower than it is in saline solution, the increase in efficiency resulting from this low value of d, can be adjusted to a lower value by increasing the mass fraction, m, or by decreasing the particle size, or by a suitable combination of these changes.

Where the secondary cathode metal associated with the sacrificial anode is formed from excess tin present in the composition, the cathode metal is essentially elemental tin and will be referred to herein as tin, excess tin, particles of tin, secondary electrode tin, and by like phrases.

It will be understood however that although referred to in this manner, the cathode tin may contain or be associated with other metal components of the composition. For example it may be associated with the very small amounts of aluminum such as those which result in formation of the entectic of aluminum tin which melts at 228° C., the melting point of pure tin being 232° C.

In the foregoing equation the density factor, $s$, is effectively a constant where the secondary cathode is formed from excess tin in a high purity aluminum-tin composition, and this factor does not play an important role in adjustment of anode efficiency. However, where other substances capable of forming secondary cathodes in the aluminum-tin composition are included, either solely or in combination or association with tin secondary electrodes, significant changes may be made in the density factor, $s$, and appreciable adjustment of anodic efficiency of the primary anode composition may correspondingly be made in accordance with the equation given above.

In general the material suitable for inclusion in a composition which exhibits improved galvanic properties in accordance with this invention should be capable of being included in said composition in electrical association with the tin-containing aluminum of said composition without appreciably reducing the solid solubility of tin, should preferably be in the form of discrete particles at anode operating temperatures, should have a high electronic conductivity and a low hydrogen overpotential, and should be formed of a substance which is substantially less reactive with the environment than the aluminum of said composition and which does not form high resistance surface layers by said reaction.

Where the anode operating temperatures are higher it is preferred to employ particles of higher melting substances such as the carbides, nitrides and borides of titanium and zirconium, and like materials.

As indicated above, it is similarly within the scope of the present invention to practice the second method of incorporating n-type defects in the surface layer formed by including in the metal composition, anions of lower valency than the anions which enter reaction with the composition to form the surface layer thereon.

For example in the case of the reaction of the composition to form an oxide layer, additional n-type defects can be created in the layer by incorporation in the composition of monovalent anions in the aluminum composition on which the layer is to be formed. Fluoride anions are particularly effective for this purpose although others such as chloride, bromide, and iodide may be used.

The incorporation of additives in the aluminum composition need not be in the molten state nor need the additives be soluble or miscible with the aluminum base into which they are incorporated. Thus additives can be introduced by admixing the components of the composition in solvent pulverulent form as by mixing aluminum powder and fluoride of aluminum or other metal fluoride by powder metallurgy techniques to form an intimate association and substantially uniform distribution of fluoride ion in the aluminum base material.

Alternatively aluminum powder can be treated with dilute mixtures of fluorine gas as for example mixtures containing five percent or less of fluorine gas in inert gases such as nitrogen, carbon dioxide and the like.

It is particularly important in making such additions to provide a quantity of anion which will result in a continuous development of additional n-type defects in the surface film to a degree which causes a substantial change in the resistance of this film and in the galvanic properties exhibited by the composition.

Where galvanic applications of the composition are to be made, as for example sacrificial anode applications, it is sometimes preferred to have present in the composition, in addition to the additive which provides n-type defects to the surface film, a second phase finely divided uniformly distributed conductive material to serve as secondary electrode in the anode. This material may also be added or formed by one of a number of alternative procedures, or by combinations of such procedures. For example the secondary cathode particles may be formed as described above by solidification of excess tin from a melt. This composition may then be converted to a powder, which in turn may be treated to add anionic constituents which serve as an additional source of n-type defects to the composition formed from the treated powder. In this composition the anionic additive supplements the metastable solute tin as a source of n-type defects.

Alternatively particulate secondary cathodes may be added to anion treated aluminum as a discrete particulate additive. For example finely divided metals such as bismuth, lead, and noble metal particles may be used for this purpose. In addition metal compounds such as the nitrides, borides, carbides of metals such as titanium, and zirconium may be employed for this purpose. It will also be appreciated that to the extent that these compounds are insoluble in molten aluminum, they may be added as particulate secondary electrodes directly to a melt of the aluminum composition.

The composition may contain other ingredients but so long as the ingredient capable of producing the additional n-type centers in the oxide is available to the aluminum components of the mixture in a concentration which results in improved galvanic properties on a continual basis, the composition falls within the scope of this invention.

The following examples are given to illustrate some of the preferred methods of carrying out the present invention in one of its aspects, and the novel and useful compositions which are thereby produced. However, it will understood that these examples are given to illustrate this aspect of the invention and should accordingly not be interpreted as defining or limiting the scope of the invention made.

EXAMPLE I

The following states in a general way the steps of the procedures which were employed in producing, treating and testing alloy compositions of aluminum and tin. In the more specific examples which follow, except where an indication to the contrary is given, a reference to a particular step, apparatus, or operation is intended to be to those described in this general example.

The metals used in these examples are high purity aluminum (99.995% Al) and high purity tin. References to aluminum and tin in this application are intended to be to the high purity materials where no indication to the contrary is given.

The aluminum charges were weighed to the nearest hundredth of a pound and the tin was weighed to the nearest hundredth of a gram. Thus a charge of 21 pounds of aluminum weighed 21.00±0.01 pounds.

The aluminum charge was in each instance weighed and placed in a crucible adapted to contain 30 pounds of aluminum, and provided with a small pouring lip. The crucible was of the usual clay-graphite type used in foundry melting and was completely coated on the surfaces exposed to liquid metal with a slurry-deposit coating formed from a ceramic powder obtained from the Norton Company, RA1139. In preparing the crucible the wet slurry coating was first formed and the crucible was then heated to consolidate the slurry particles and to remove any moisture. The coating, both in this use and all others indicated below was to avoid contamination of the melt, and other similarly inert coatings could be used instead for this purpose.

The aluminum charge was introduced into the crucible and was melted in a gas-fired furnace. As indicated in some of the specific examples below, the melt temperature was raised at this point to a sufficiently high temperature so that subsequent operations could be performed without further heating before pouring the melt at a temperature of above 1300° F.

Alternatively heating during some of these operations, or reheating after some operations were carried out, was used to prepare the melt for casting. All temperature measurements were made with a thermocouple coated with a layer of the dried ceramic coating used to coat the crucible.

In each case the tin was incorporated in the melt with the aid of a graphite phosphorizer-type stirrer and by stirring for four minutes. Also in each case the melt was degassed following the addition of the tin by flowing chlorine into the melt for four minutes using a preheated graphite fluxing wand. A chlorine flow rate was used which was just less than that which would cause a turbulance at the melt surface sufficient to cause exposure of liquid metal directly to the atmosphere. In most cases it was about 2500 cc. per minute.

Skimming of the melt was carried out using a graphite skimming tool to remove material floating on the melt surface.

As indicated in some of the individual examples a test for contained gas was carried out. This is the conventional test for this purpose in which a steel specimen cup of about 150 cc. capacity, coated with consolidated RA 1139 powder, was dipped into the melt to remove a liquid sample for testing. The test performed involved placing the liquid metal test sample in a glass covered vacuum chamber and evacuating the chamber as the molten sample cooled and solidified. The number of gas bubbles which appeared at the surface of the sample before solidification was taken as a measure of the amount of contained gas. After degassing, the crucible and contents were removed from the gas fired furnace to a casting station and allowed to cool as necessary to the desired casting temperature.

When at the desired temperature the melt was poured into a preheated steel mold internally coated with a protective layer formed from a surface deposit of pulverized limestone. The surface deposit was formed by bringing a slurry of the limestone into contact with all of the internal surfaces of the mold, decanting the excess slurry, and heating the mold to 750° F., the preheat temperature for casting.

The molds used were in the form of rectanguloids open at one end and formed by edge welding of steel sheet stock of one quarter inch thickness. The internal dimensions of the mold were approximately 16 inches in length by six inches in width by about either 1⅛″ or 1½″, this latter figure being approximate due to a taper of the mold from its open to its closed end both in width and depth. The mold was supported and suspended in the top of a cooling vessel of about 25 gallon capacity just above an initial water level. The vessel was adapted to be filled from the bottom at a controlled rate to give a rate of rise of cooling water around the mold of from 1.5 to 6 inches per minute as indicated in specific examples below.

As the rise of water caused solidification of metal in the mold, piping developed in the melt and was overcome by pouring additional liquid metal from the crucible.

Further cooling of individual ingots following solidification in the molds was carried out by cooling 3 minutes in the mold in the water bath followed either by removal from the mold and cooling to room temperature in air or by ejection of the ingot from the mold and quenching in water.

When cooling was complete the ingot was removed from the mold and the upper one fourth of the ingot was removed and discarded.

The cooling procedures employed were those designed to favor the production of columnar grain structure.

EXAMPLE II

Ingot 841 was prepared substantially as described in Example I to contain 0.08% tin. For this purpose 21 pounds of high purity aluminum (99.995% Al) were melted in a 30 pound crucible and heated to 1315° F. The furnace was turned off and 7.60 grams of high purity tin were immediately stirred into the melt. After four minutes' stirring the heating was resumed and the melt temperature was raised to 1340° F. by heating for seven minutes.

It was then degassed with chlorine using a gas wand and after degassing for four minutes, the melt was skimmed and poured within three minutes of the degassing operation into a mold preheated at a temperature of about 750° F.

The mold was cooled by raising the level of cooling water around it at a rate of 3 inches per minute.

EXAMPLE III

Ingot 842 was prepared to contain 0.12% tin by adding 11.44 grams of high purity tin to 21 pounds of high purity aluminum following the procedure set out in Example I except for specific variations set out below.

The aluminum was melted in the coated 30 pound crucible and raised to a temperature of 1310° F. The tin was introduced into the melt at this temperature and stirred in for four minutes. At the end of the stirring the temperature was 1350° F. and chlorine wand degassing was then commenced and continued for the next four minutes. The melt was then held for four minutes, skimmed in the succeeding minute and poured at 1320° F. into the mold having an average thickness of 1.12 inches. The mold was cooled by external water rise at a rate of 3 inches per minute.

EXAMPLE IV

Ingot 843 was prepared to contain 0.20% tin by adding 20.58 grams of high purity tin to 21 pounds of high purity aluminum following the procedure of Example I except as to detailed particulars set out below.

The aluminum was melted in a coated 30 pound crucible and raised to a temperature of 1310° F. at which temperature the furnace was turned off. The tin was introduced and stirred for four minutes at the end of which the temperature again read 1310° F.

The melt was again heated for five minutes to a temperature of 1345° F. and chlorine degassing was commenced at this temperature. After four minutes of degassing the melt was skimmed. Three minutes after degassing was completed the melt was poured at a temperature of 1315° F.

The mold was externally cooled at a water rise rate of three inches per minute.

EXAMPLE V

Ingot 897 was prepared to contain 0.10% tin by the addition of 9.51 grams of pure tin to 21 pounds of aluminum. The aluminum charge in the furnace was heated to 1370° F. and the tin was added and stirred for four minutes. Immediately after the tin addition the melt was skimmed and a metal sample was taken at 1380° F. After seven minutes the melt was degassed at a temperature of 1395° F. by a chlorine gas wand.

Four minutes later a metal sample was taken at 1360° F. and a vacuum test performed. Six gas bubbles were taken to indicate excessive gas content and the melt was given a second degassing treatment for three minutes. A metal sample taken and vacuum tested at this point indicated no gas present. Eleven minutes later the temperature had dropped to 1200° F. and heating was resumed. After thirty minutes heating the temperature reached 1330° F. The melt was poured four minutes later after having cooled to 1320° F. and a second sample was taken for chemical analysis.

The rate of cooling water rise used was six inches per minute. The average mold thickness was 1.5 inches. After this cooling the ingot was ejected from the mold and quenched in water.

EXAMPLE VI

Ingot 898 was prepared to contain 0.18% tin and was formed by adding 17.12 grams of tin to 21 pounds of aluminum. The melt was brought to 1440° F. and heating was discontinued. Twelve minutes later the temperature had dropped to 1410° F. and the tin was added and the melt stirred for four minutes. Immediately after tin addition the melt was skimmed and a sample was taken. The melt was then degassed for four minutes and a sample taken and vacuum tested for gas content. No indication of contained gas was found.

The melt was prepared for casting, skimmed again and poured at a temperature of 1300° F. The rate of cooling water rise was six inches per minute and the mold used averaged 1.5 inches in thickness. Following this cooling the ingot was ejected from the mold and quenched in water.

EXAMPLE VII

Ingot 899 was prepared to contain 0.30% tin and was formed by adding 28.53 grams of tin to 21 pounds of aluminum. In this case heating of the molten aluminum was discontinued at 1390° F. and the tin was added with stirring for four minutes. A sample was taken two minutes after stirring was completed.

Nine minutes later the melt temperature was 1390° F. and degassing was carried out for four minutes. A sample taken for vacuum testing indicated that no gas was present. The melt was transferred to a casting station skimmed and sampled and poured four minutes after degassing was complete at a temperature of 1320° F. The rate of cooling water rise was six inches per minute and the mold thickness averaged about 1.5 inches. This ingot was also then ejected from the mold and quenched in water.

EXAMPLE VIII

Ingot 6026 was prepared to contain 0.12% tin by adding 11.41 grams of tin to 21 pounds of aluminum. The aluminum was first heated to 1420° F. Tin was added and stirred for four minutes after which the temperature was found to be 1425° F. Chlorine fluxing was carried out for four minutes, the melt was skimmed, and a sample was taken for a test of contained gas. The appearance of four bubbles was taken as an indication of quite low gas content.

Fifteen minutes later a sample was taken and the melt was poured at a temperature of 1325° F. A water rise rate of three inches per minute was used in cooling the first three or four inches and the rate was then maintained at 1.5 inches per minute for the remainder of the cooling. The mold was kept in water for three minutes and then withdrawn and air-cooled to room temperature.

EXAMPLE IX

Ingot 6027 was prepared to contain 0.12% tin using the same weights of aluminum and tin given in Example VIII. Heating of the aluminum melt was stopped when it had reached 1420° F. The tin was added and stirred in for the next four minutes, and chlorine degassing was carried out for the following four minutes. Chlorine degassing was accomplished at a flow rate of 2500 cubic centimeters per minute. A metal sample was taken at 1410° F. and subjected to vacuum testing. It indicated a relatively low gas content in the melt. Seven minutes after completing degassing the temperature was 1335° F. and a second sample was taken. Two minutes later the melt was poured into a mold having an average thickness of 1.5 inches and the mold was cooled by external water rise at a rate of 1.5 inches per minute. The ingot was cooled three minutes in water, removed from the mold, and then quenched in running tap water.

EXAMPLE X

Ingot 6028 was prepared to contain 0.12% tin by combining the quantities of aluminum as given in Example VIII. The melt was heated to 1420° F. and tin was added and stirred in for four minutes. The melt was promptly degassed for four minutes at a chlorine flow rate of 2500 cc. per minute. A sample test by the vacuum method indicated the gas content to be relatively low, the temperature at this point being 1460° F.

The melt was allowed to cool for ten minutes to a temperature of 1340° F., a sample was taken, and the melt was poured a minute later into a mold of about 1.12 inches in thickness. A water rise rate of 1.5 inches per minute was used, and it was observed that the top of the ingot was frozen over about five minutes after pouring and at a time when the cooling water was about halfway to the top of the mold.

EXAMPLE XI

Ingot 6029 was prepared to contain 0.12% by combining the quantities of metal given in Example VIII.

The heating of aluminum was discontinued after the melt reached a temperature of 1450° F. Tin was added and stirred in during the next four minutes, and the melt was chlorine degassed during the following four minutes at a chlorine flow rate of 2500 cc./minute. Vacuum testing of the melt indicated the gas content to be relatively low.

Six minutes after fluxing was complete, the melt was transferred to the casting station where it was allowed to cool to about 1330° F. before pouring. It was cast into a mold of about 1.12 inches thickness and cooled three minutes in the water bath and then air-cooled to room temperature.

EXAMPLE XII

Ingot 6030 was prepared to contain 0.12% tin by combining the quantities of metal set out in Example VIII.

The aluminum charge was added and stirred in for the next four minutes after which the melt was degassed for the following four minutes. The vacuum test for contained gas indicated no gas to be present at the start of the test, but about 15 bubbles were detected at the end of freezing. After fluxing, the temperature of the melt was determined to be 1430° F.

Four minutes later the melt was transferred to a cooling station where it was skimmed and sampled. After four additional minutes at the casting station the melt temperature had dropped to 1320° F., and it was cast in a mold of about 1.12 inches thickness. The cooling was accomplished by a water rise of three inches per minute followed by three minutes in the water bath and then air-cooling to room temperature.

EXAMPLE XIII

Ingot 6031 was prepared to contain 0.10% tin by adding 9.51 grams of tin to 21 pounds of aluminum.

The aluminum charge was melted and the furnace shut off when the melt temperature reached 1450° F. The tin charge was added and stirred for the next four minutes and chlorine degassing was carried out for the following four minutes. A melt sample vacuum tested for contained gas indicated a relatively low gas content. Two minutes after completion of degassing the melt temperature was 1420° F., and it was transferred to the casting station.

Eight minutes later it was skimmed and sampled and then poured at 1315° F. into a mold of about 1.12 inches average thickness. The cooling was carried out at a 3-inch-per-minute water rise rate followed by a three-minute cooling in the water bath and air-cooling to room temperature.

EXAMPLE XIV

Ingot 6032 was prepared to contain 0.18% tin by adding 17.12 grams of tin to 21 pounds aluminum.

Furnace heating of the charge was discontinued when the melt reached 1430° F. Tin was added and stirred in for the next four minutes, and chlorine degassing was carried out during the succeeding four minutes. Vacuum testing for contained gas resulted in formation of fifteen bubbles when freezing of the sample was completed.

Two minutes after completion of degassing the melt was transferred to the casting station and sampled. It was poured at a temperature of 1320° F. into a mold having an average thickness of about 1.12 inches. A cooling water rise rate of 3 inches per minute was used followed by a three-minute cooling in the water bath and air cooling to room temperature.

EXAMPLE XV

Ingot 6033 was prepared to contain 0.30% tin by adding 28.54 grams of tin to 21 pounds of aluminum.

The aluminum charge was heated from room temperature in the usual 30-pound coated crucible to 1210° F. within 35 minutes. Five minutes later the tin was added and stirred in for four minutes. Chlorine degassing was carried out during the succeeding four minutes. The melt temperature was found to be about 1400° F. and vacuum testing of a melt sample indicated the gas content to be at a moderate level.

The melt was transferred to the casting station, skimmed and poured at a temperature of 1320° F. A cooling water rise rate of three inches per minute was used followed by a three-minute cooling in the water and air cooling to room temperature. The average mold thickness was again about 1.12 inches.

The following is a summary table of several parameters found in the foregoing examples.

SUMMARY TABLE OF EXAMPLES

Al-Sn *alloy casting condition and compositions*

| Ingot No. | Ingot thickness at center (inches) | Rate of water rise around mold (inches/min.) | Holding time in water (min.) | Calculated charge weight (percent tin) |
| --- | --- | --- | --- | --- |
| 839 | 1⅛ | 3 | 3 | 0.02 |
| 840 | 1⅛ | 3 | 3 | 0.04 |
| 841 | 1⅛ | 3 | 3 | 0.08 |
| 842 | 1⅛ | 3 | 3 | 0.12 |
| 843 | 1⅛ | 3 | 3 | 0.20 |
| 897 | 1½ | 6 | *3 | 0.10 |
| 898 | 1½ | 6 | *3 | 0.18 |
| 899 | 1½ | 6 | *3 | 0.30 |
| 6026 | 1½ | 1½ | 3 | 0.12 |
| 6027 | 1½ | 1½ | *3 | 0.12 |
| 6028 | 1½ | 1½ | 3 | 0.12 |
| 6029 | 1⅛ | 6 | 3 | 0.12 |
| 6030 | 1⅛ | 3 | 3 | 0.12 |
| 6031 | 1⅛ | 3 | 3 | 0.10 |
| 6032 | 1⅛ | 3 | 3 | 0.18 |
| 6033 | 1⅛ | 3 | 3 | 0.30 |

*These ingots were ejected from the molds after solidification and quenched in water. All other ingots were air cooled in the molds.

Certain properties of the compositions formed as described in the above examples were determined using a standardized procedure for selection and preparation of specimens for testing. Specimens were prepared from sections of the ingots by machining. Specifically the corrosion specimens used for determining galvanic properties were milled to 0.197 x 0.197 inches (5 mm. x 5 mm.) in cross section and 3 inches (75 mm.) length. The long dimension of each specimen was in the long direction of the casting and normal to the direction of columnar crystal growth. One specimen was taken from the central plane of the casting where the columnar crystals from both cooling surfaces came together. The other two specimens were taken from about midway between the central and surface planes of the casting. Central plane defects were avoided in corrosion specimens. This selection and preparation of test specimens not only permits experimental error to be minimized, it also provides an indication of the reproducibility of galvanic corrosion and other characteristics throughout the thickness of the ingots.

Determination of galvanic corrosion properties were carried out by coupling the test specimens to sheet steel cathodes having an apparent surface area of 10 sq. cm. and using a reference test cell substantially as described in an article in the Journal of the Electrochemical Society, volume 105, No. 11, starting at page 629. All determinations were carried out in 0.1 N sodium chloride solution at 25°±0.1° C. The galvanic currents were measured continuously by shorting the cell through a 1 ohm resistance and continuously recording the drop in potential.

In addition to the determinations of galvanic properties a detailed metallographic examination of the alloy composition was carried out. For these examinations the metallographic samples were electropolished prior to etching in perchloric acid dissolved in water plus alcohol with butyl Cellusolve additive, because their softness made mechanical polishing extremely difficult.

Electrical resistivity measurements were made on the Al-Sn alloys with the test specimens, grips, and potential leads immersed in an oil bath maintained at 30±0.1° C. and using a high precision Kelvin bridge.

Specific resistance of the natural oxide films, stable on Al-Sn alloys immersed in 0.1 N NaCl at 25±0.5° C., were obtained from measurement of the dissipation factor across the film covered metal at a bridge frequency of 1 kc. using the solution as a virtual electrode and a large platinum grid as a second electrode. Specific resistance is inversely proportional to dissipation factor measured in this fashion.

Other measurements were similarly made using conventional techniques.

In the description which follows the significance of the differences found will be given greater clarity by reference to the accompanying drawings in which:

FIGURE 4 is a metallograph of the microstructure of as-cast aluminum-tin alloys;

FIGURE 8 is a similar plot of the ultimate and yield strengths of the alloy against the alloy tin content;

FIGURE 9 is a similar plot of the percentage elongation of the alloy against alloy tin content;

FIGURE 10 is the same type of plot showing the relationship of Brinell hardness to alloy tin content;

Figure 1:
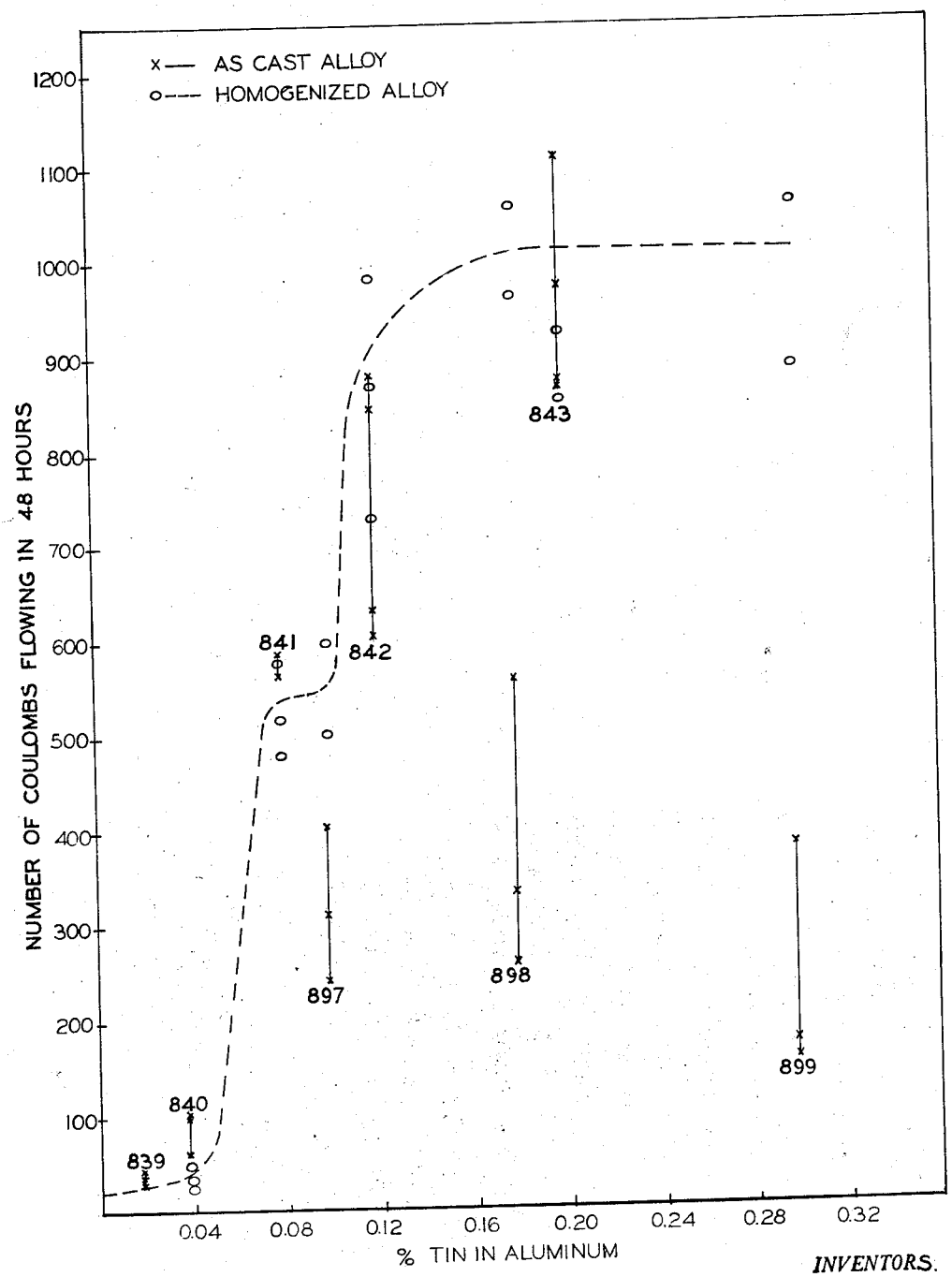
FIGURE 1 is a graph in which the galvanic current is plotted as the ordinate against the percentage of tin in the aluminum as the abscissa.

The effect of tin content on the galvanic corrosion characteristics of the aluminum-tin to steel couple in 1.0 N NaCl at 25° C. is shown in FIGURE 1. The total anode weight loss values for the as-cast ingots are plotted in FIGURE 2 and the values of γ anodic efficiency are plotted in FIGURE 3.

The values plotted are for the numbered ingots indicated in the figures. The vertical line shows the spread of the three individual determinations for each ingot and the x indicates the individual values determined.

The other values for these ingots, also plotted on these figures, are for the same ingot compositions but following a homogenization treatment, and these will be discussed below.

As is readily evident from FIGURES 1 and 2 the alloying of aluminum with tin at concentrations below 0.04% results in only a minor increase in galvanic current flow. However, once the tin content is increased to 0.08%, a large increase in current flow is obtained up to and including tin contents of 0.30%. As is also evident from the figures for the series of alloys 841, 842, and 843, a distinctly higher set of values were obtained than were obtained for the series of ingots 897, 898, and 899. This difference between these galvanic corrosion characteristics, including the galvanic current, total anode weight loss, and $\gamma$ anodic efficiency, for the two sets of ingots is attributed to certain relatively small differences in the manner of preparing the two sets of ingots. By proper adjustments of the preparation variables to follow the procedures employed in preparation of the first series, ingots can be prepared which have galvanic characteristics which closely approximate those of the homogenized material indicated in the figures by the dashed line.

A preferred procedure suitable for preparation of as-cast ingots having a desired combination of galvanic characteristics is not to be understood as limited to the preparation of ingots according to the details of the above examples. Rather, these examples illustrate the basic parameters which must be adjusted in producing ingot which is highly effective in applications requiring improved galvanic properties, or a particular combination of properties for a specific application. Thus, different sizes and shapes of ingot may be cast, a variety of thin concentrations may be used, additional secondary cathode additives may be combined in the composition, and a wide variety of heating, degassing, pouring, cooling, and other variables may be employed in the preparation of compositions within the scope of the present invention. Another alternative preparation is by continuous or semi-continuous casting of ingot using one of a number of methods and devices now conventionally used in the preparation of ingot directly from a melt on a continuous basis. One illustration of such alternative preparation which has been used effectively in producing the alloys of this invention is the semi-continuous casting of ingots by the conventional direct chill process. Tests of ingots thus formed containing 0.12% tin showed that substantially identical improvements in alloy properties as those shown in the figures are obtained for as-cast and homogenized alloy.

A number of adjustments of melt preparation and casting variables are necessary because of the nature of the alloy. Thus, because the melting points of the two ingredients of the composition are so widely separated, it is necessary to employ measures in continuous casting to overcome liquation which otherwise occurs. Similarly, in casting in the molds of the above examples an appreciable amount of mold distortion occurred and in the series following the 839–843 castings a different external reinforcement was added to the mid section of the molds in the form of a rib or strip of ¼ inch sheet steel stock which was welded to the external surface of the mold in place of an angle iron strip of similar dimensions. This reinforcing rib was effective in reducing the amount of buckling and similarly, the difficulty of removing the ingots from the molds. Numerous other similar adjustments can be made in the process composition variables to produce as-cast ingots having a desired combination of galvanic properties.

One of the unique features of the present invention is the capacity which these compositions have to be changed with regard to their galvanic characteristics by heat treatment. Thus, whatever may be the characteristics of the as-cast material, these characteristics may be changed in large degree by thermal treatment of the composition.

Figure 2:
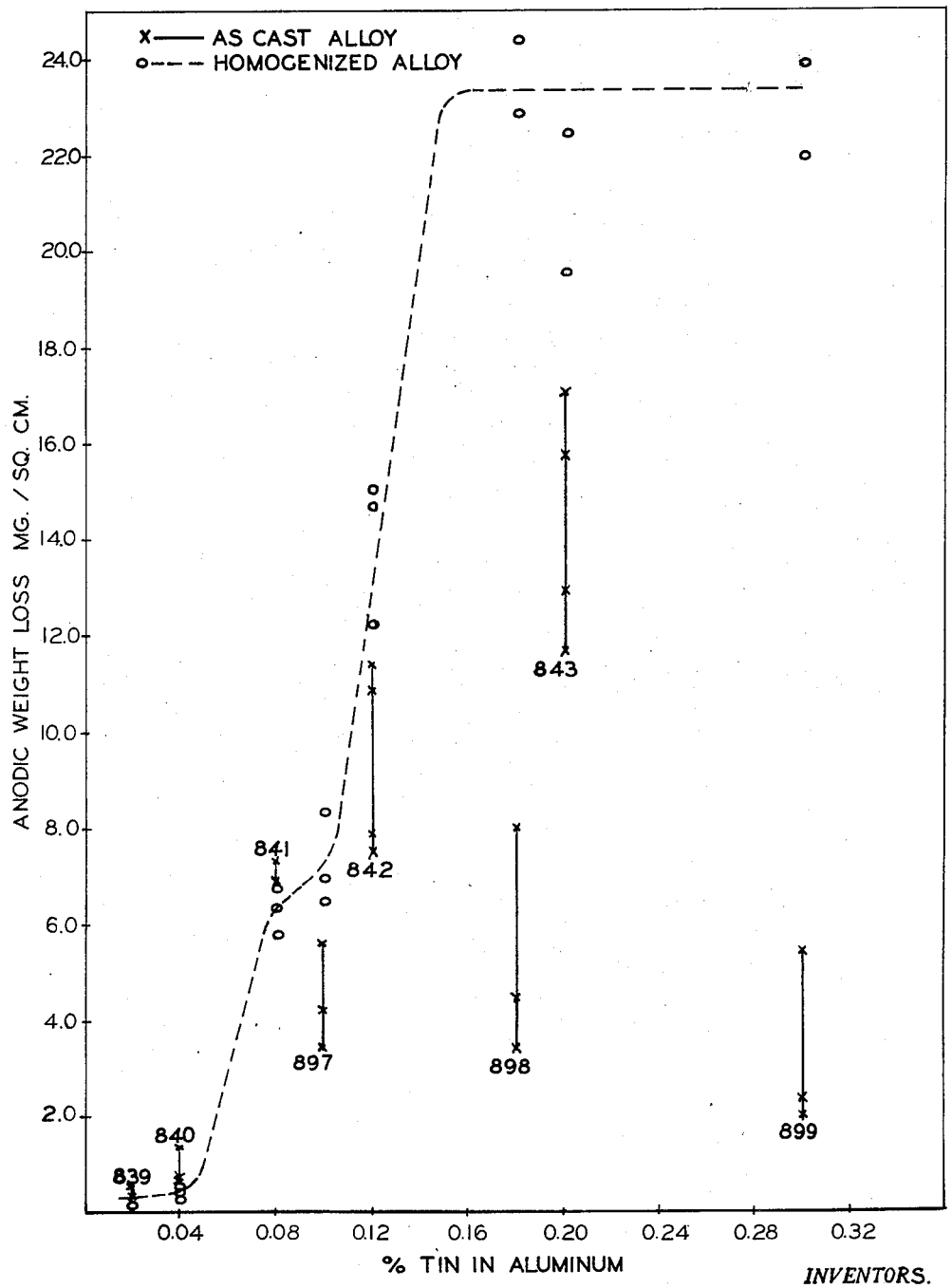
FIGURE 2 is a similar graph showing the relationship between the anode weight loss and the percentage of tin in the aluminum.
Figure 3:
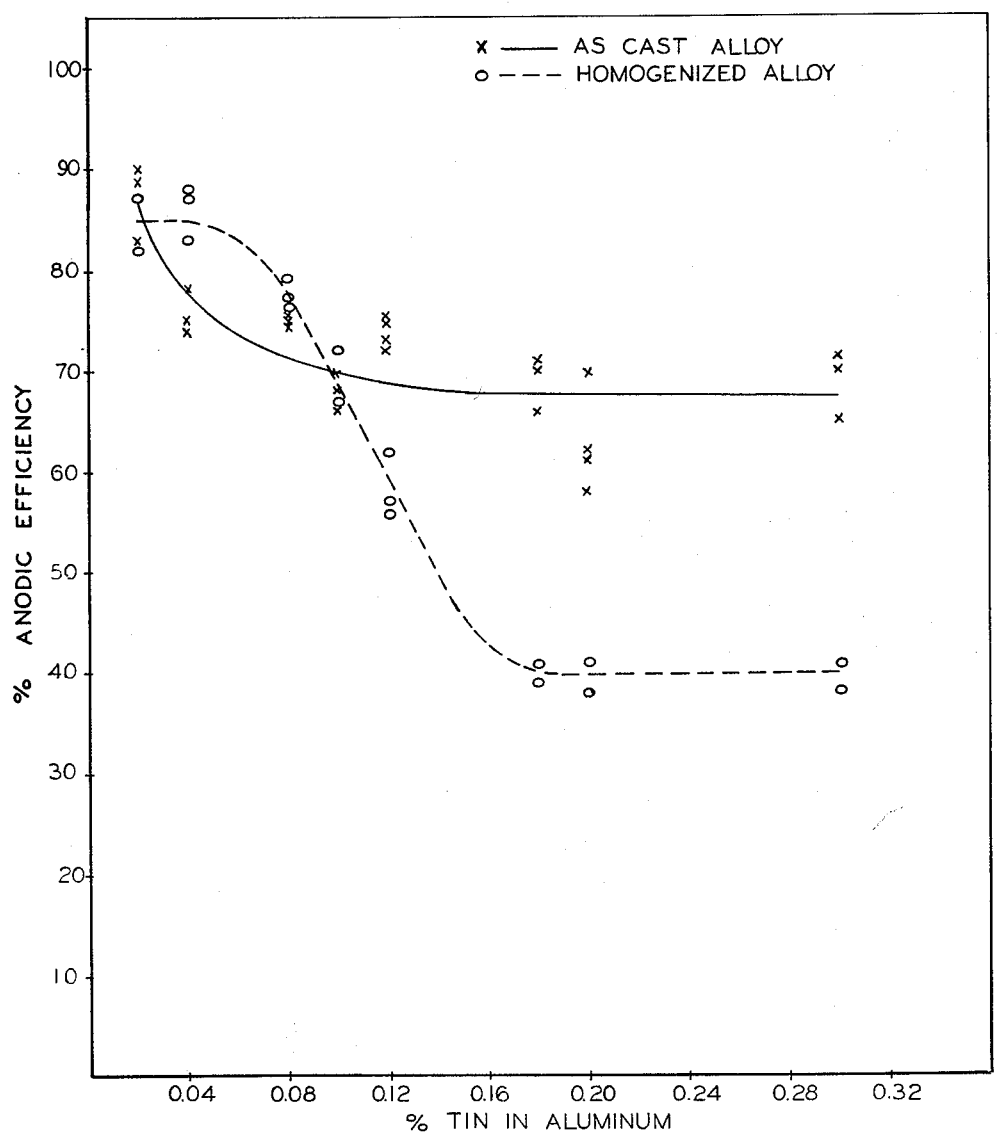
FIGURE 3 is a similar graph in which the percentage efficiency of the anode is similarly plotted against the percentage of tin in the anode.

One such treatment is illustrated in the values plotted in FIGURES 1, 2 and 3. For example, in FIGURE 1 the average galvanic current produced by the test specimens taken from ingot 898 in the as-cast condition was about 330 coulombs in 48 hours. By a thermal treatment this current value was raised about three fold to a value of about 1000 coulombs. The thermal treatment used for this purpose is the reference homogenization treatment defined and described above. As is further evident from the FIGURES 1, 2 and 3 the other galvanic characteristics are also remarkably changed in their respective values by this heat treatment procedure.

Thus one of the features of this invention is that regardless of the values of galvanic characteristics which are produced in the as-cast alloy, a thermal treatment can reliably and reproducibly bring the values to a predetermined reference level.

Returning now to further consideration of the alloy in the as-cast condition it may be seen in FIGURE 3 that the initial anodic efficiency of a cast specimen of Al–0.02% Sn is about 87%. However as the tin content of the alloy is increased and much larger currents flow, the anodic efficiency drops to a steady value of about 65 or 67%.

The suitability of as-cast ingot for sacrificial anode used may also be determined to a large degree by the metallographic examination of the material. From such examination of the 839–843 series it was determined that the corrosion of specimen from ingot 843 was at a desirable level of uniformity. However where a specimen was found to be heavily corroded near the grain boundaries, or where the corrosion was confined to bands situated on either side of the grain boundary itself, this indicated that a premature disintegration of the sacrificial anode would be likely to occur. Accordingly it is within the scope of this invention to prepare as-cast alloys which corrode at a desirable level of uniformity and to use metallographic examination to establish the degree of uniformity.

From a number of studies, tests and examinations made relating to the sequence of events in the solidification process the following sequence was deduced although it will be understood that the validity of the method of producing desirable as-cast ingot should not be interpreted as being dependent on the accuracy of this statement of sequence. After the molten aluminum contacts the mold wall, nuclei of nearly pure aluminum form at the mold walls and grow rapidly with little temperature change, gradually but slightly increasing in tin content. The tin enriched liquid aluminum alloy is concentrated in the interstices of the dendrites thus formed. It is not until the major part of the total volume of the melt is solid that the temperature will have dropped to near 620° C. and the newly formed solid solution will begin to contain the maximum of 0.1% tin in solid solution.

Evidence of the formation of these regions having maximum tin in solid solution are the formation of dark regions as a result of etching in the metallographic specimens as shown in FIGURES 4a, b, and c.

As the temperature drops below the range of maximum solid solubility, the solid aluminum again forms with low tin content, producing the clear regions immediately adjacent to the grain boundary as seen also in FIGURE 4. Finally, the last tin-rich liquid forms the eutectic aggregate at 228° C.

During the solidification interval below 620° C. there is doubtlessly some precipitation of tin-rich phase from the solidified supersaturated solid solution. This would occur mainly in the sub-grain boundaries and possibly in the dark regions of FIGURE 4 formed by etching in the regions of high tin content.

While there are numerous other specific and localized effects which attend the solidification of the melt, the foregoing is deemed to represent one of the more important overall effects relating to the characteristics of the composition produced in the as-cast condition.

As indicated above one remarkable feature of this invention is that it has been found possible to improve the galvanic properties of the composition by a thermal treatment after the material has been completely solidified and cooled. It is also in keeping with this invention to interrupt the cooling process in order to enhance to a desired degree the galvanic properties of the as-cast material. One such procedure is carried out by holding the composition at a temperature where tin is soluble to a high degree in the aluminum and then cooling the composition to cause the composition to be highly supersaturated in tin.

The differences between compositions prepared by fast cooling through the temperature region of maximum tin solubility in aluminum and those prepared by slow cooling through this region or by reheating and homogenizing are evidenced by a number of tests and examinations which showed the tin to be distributed in non-uniform fashion in the compositions of the first group and to be uniformly distributed in compositions of the second group.

Figure 5:
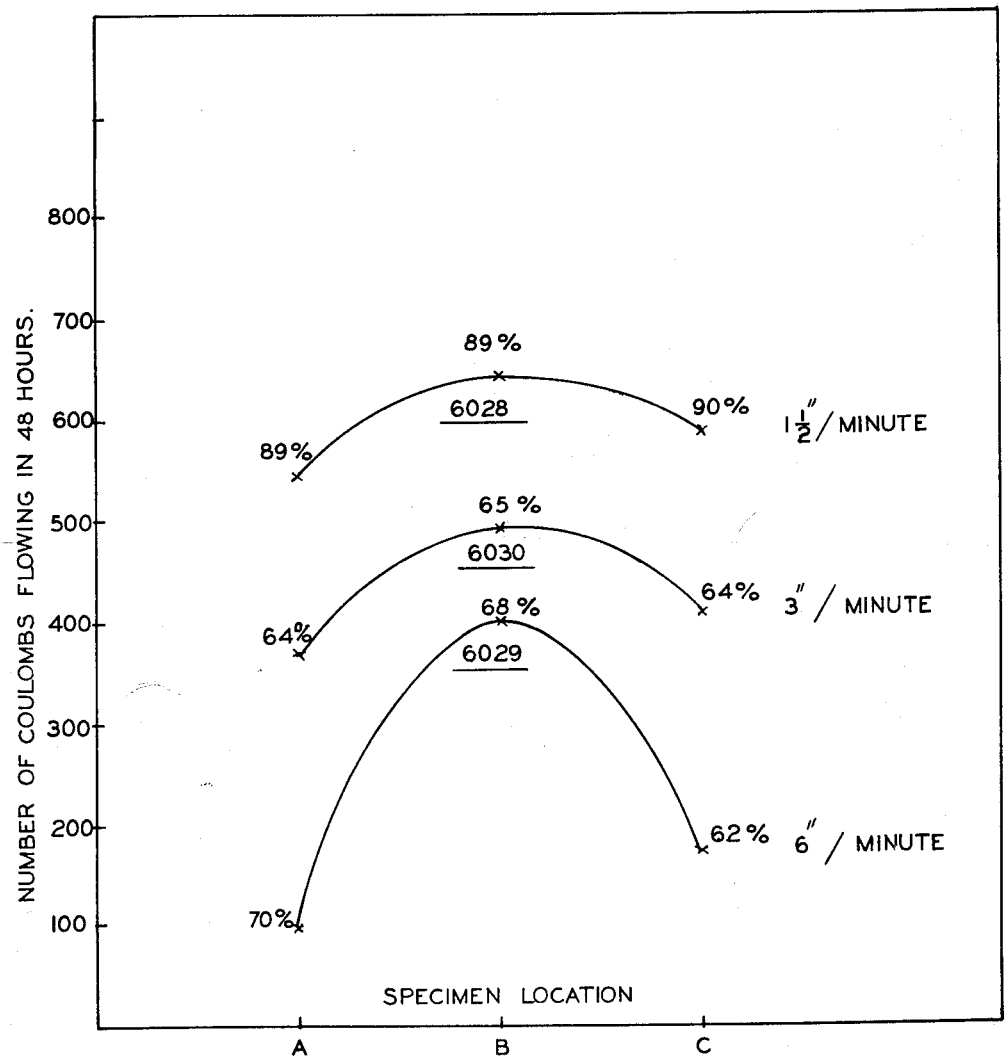
FIGURE 5 is a graph, showing the relationship between the number of coulombs flowing in 48 hours from specimens at different locations in as-cast ingots and the cooling rates of the as-cast ingots.

These same differences are also evidenced by the different galvanic characteristics exhibited by alloy compositions which are cooled at different rates. Referring particularly now to FIGURE 5, there are plotted the results of galvanic current measurements on three alloys prepared by substantially identical procedures as described more particularly in Example I but cooled at three distinct cooling water rise rates as indicated on the figure. Each of these ingots contained 0.12% tin.

It will be observed from the galvanic current measurements plotted in FIGURE 5 that there is a distinct correlation between the current measurements obtained and the cooling rates used which indicates that slower cooling rates should be used in preparing ingots having higher galvanic currents. This is true not only for the overall correlation among the three specimens but can be seen to be true also for the relative values obtained for the three samples A, B, and C taken from a single sample. Thus, the highest of these three values is, for each ingot, that obtained from the middle of the ingot, B. The values for the specimens A and C, taken from the edges are seen to be lower. Further as is evident the non-uniformity of galvanic corrosion characteristics through the thickness of the ingot increases with increasing cooling rate.

It has further been found that although anodic efficiency does not vary markedly throughout the thickness of individual ingots at any rate of water rise the greatest efficiency may be obtained by using the lowest rate of water rise.

Figure 6:
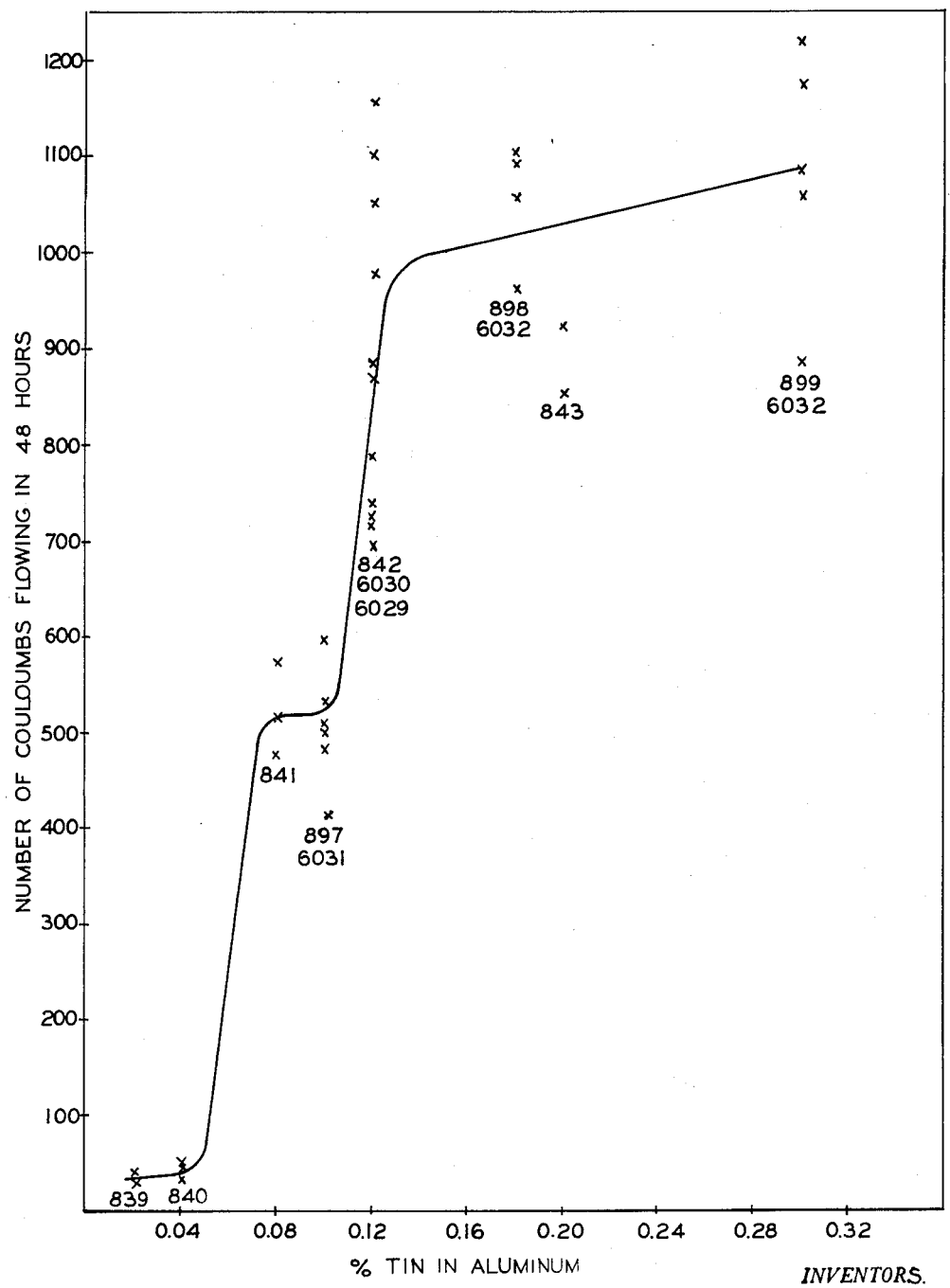
FIGURE 6 is a graph similar to FIGURE 1, showing a summary plot of the values determined for homogenized specimens of the ingots indicated on the graph as they are related to percentage of tin in the alloys.
Figure 7:
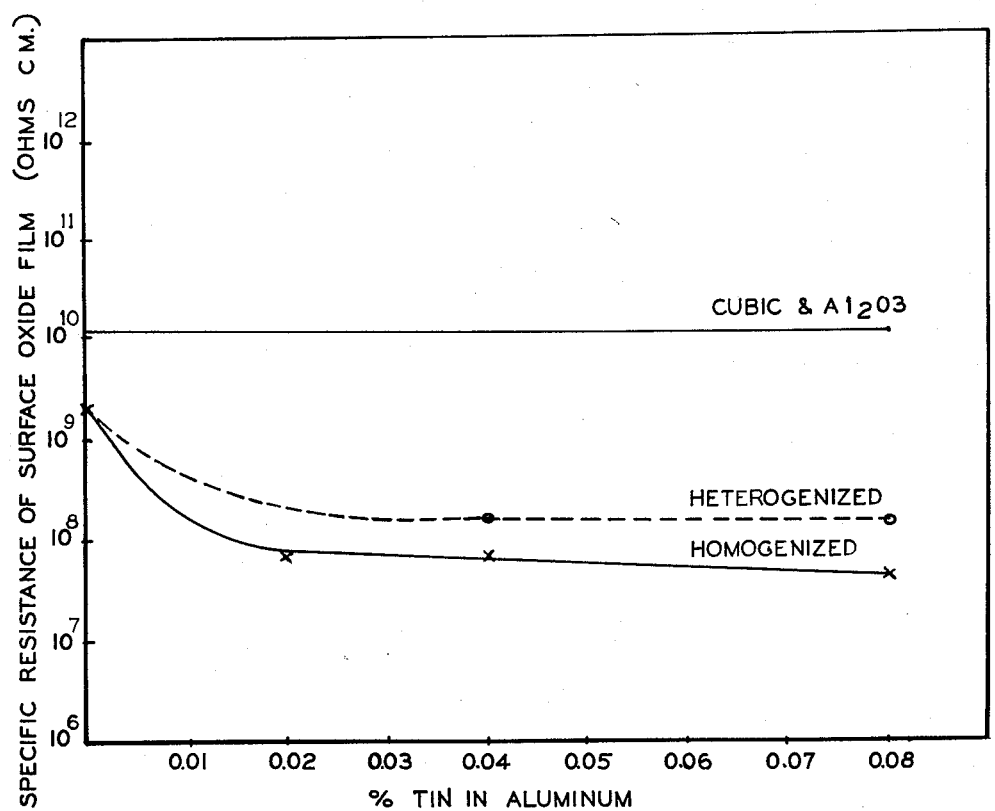
FIGURE 7 is a graph showing the relationship between the values of specific resistance of natural oxide film and the tin content of the alloy in the homogenized and heterogenized conditions.

Although as indicated above higher values of galvanic current and anodic efficiency can be achieved by the slower rate of cooling indicated in FIGURE 5, still higher rates can be attained for these same ingots. Thus, with reference now particularly to FIGURE 6 it will be seen that the curve similar to that of FIGURE 1 is plotted. However, FIGURE 6 is a plot of the galvanic current against tin content for homogenized specimens including specimens 6029 and 6030, the lower two specimens included on the FIGURE 5 graph.

In the homogenization of specimens from ingot 6029 two procedures were used. The first was to homogenize a whole section of as-cast material and then remove specimen anodes by machining in the usual manner. The other procedure used was to remove the anode specimens first and then to homogenize them. Essentially no difference in galvanic characteristics of the anode specimens prepared by these two procedures was detected. Accordingly the remarkable finding referred to above, i.e., that ingots may be produced in accordance with this invention by one of a number of different casting procedures and may have a wide spread of galvanic properties, but can be modified or adjusted in these properties by thermal treatment to essentially high uniform values, is confirmed for alternative heat treatment methods.

With regard to the cooling of ingots, the cooling rate and variables after solidification are not as important as that before solidification.

Electrical resistance measurements were made at 30° C. on 4 test specimens of ingot 841 after homogenization, i.e., heat treatment at 620° C. for 16 hours followed by water quenching. Two of the strips were precipitation heat treated at 400° C. for 24 hours and water quenched and the resistance of all four specimens were measured again with the high precision Kelvin bridge. The alloy composition was surprisingly found to have the same resistivity as high purity aluminum measured in the same way.

Another surprising property of compositions of the present invention is a significant increase of certain mechanical properties including hardness, elongation percent, tensile strength and yield strength as determined on alloy in sheet form containing 0.04, 0.10 and 0.20% Sn. The sheet was prepared by homogenizing and heterogenizing sheet rolled from ingots 840, 6031, and 843 as described below.

A distinctly superior property of the compositions of this invention is related to the characteristics of the oxide film which forms thereon. A very marked decrease in specific resistance of the oxide film accompanies the addition of tin to the alloy. Minimum specific resistance is obtained when the specimens are homogenized and the tin is in a metastable solid solution to a maximum degree. The lowest specific resistance ($4 \times 10^7$ ohm/cm.), ingot 841, was recorded at 0.08% Sn in these tests in the homogenized condition and represents an approximately 50 mold decrease in specific resistance from the value normal to the natural oxide film formed on high purity aluminum in sodium chloride solution ($2 \times 10^9$ ohms/cm.). The specific resistance of natural oxide film formed on heterogenized alloy sheet are considerably higher having a minimum value of approximately $1.5 \times 10^8$ ohm/cm. at 0.08% Sn. Accordingly by suitable adjustments of the tin content of the composition and the thermal treatment of this composition it is possible to produce surface layers having predetermined specific resistance values over a very broad range of more than fifty fold below the natural oxide of high purity aluminum.

The lowered film resistance in the homogenized film over that obtained in the heterogenized condition (a factor of 4) and parallel considerations, lead to the surprising finding that the basis for lowered film resistance of metal in the homogenized condition is the presence of tin in metastable solid solution in the alloy.

The foregoing relates very largely to the preparation and properties of as-cast compositions. Turning now more particularly to the homogenized material it will be understood that the homogenizing treatment is but one of a variety of useful thermal treatments which are applied to aluminum-tin compositions within the scope of this invention to obtain certain desired properties.

The homogenization treatment has a primary objective that of increasing the amount of tin in solid solution. The equilibrium solid solubility of tin in aluminum at 25° C. is essentially negligible whereas it is of the order of 0.1% at 620° C. It has been found that tin, once brought to a relatively high degree of solid solution by heating, may be retained in solution at or near this relatively high level in a state of metastable solid solution where the proper cooling of the composition is used, after the heating period, to enhance the level of metastable solid solution.

The thermal treatment of the compositions of this invention, particularly those consisting essentially of aluminum and tin, has as a primary purpose not only that of increasing the concentration of tin in metastable solid solution, but also that of providing the excess tin in a form and in a distribution which enhances the uniform corrosion of the alloy. The application of the reference homogenizing treatment (16 hours at 620° C. ±3° C. followed by a water quench) in the range of tin contents of 0.02 to 0.08% does not result in marked deviations in the results from those found in the as-cast condition. However, as is evident from the figures, in the higher range of tin content from 0.10 to 0.30% tin, the homogenization assists in the generation of a very high and comparatively reproducible current output. Also it has been found that despite comparatively large variations in solidification rate, ingot thickness, specimen location and rate of post-solidification cooling, all of the homogenized coulombic data can be fitted to one summary curve as shown in FIGURE 6.

The effect of the reference homogenization treatment on a number of other physical, electrical and mechanical properties of Al-Sn compositions at various levels of tin concentration is shown also in the FIGURES 7 through 10 which are essentially self-explanatory.

Although the reference homogenization treatment is very effective in producing the results indicated above, it will be understood that homogenization treatments other than the reference treatment are effective in increasing the concentration of tin in solid solution and effecting changes in the properties of the composition such as those indicated above. Thus the period of heating need not be 16 hours to effect increase in tin solute. Shorter times, or longer times at lower temperatures or variations in temperature, such as the interrupted cooling discussed above, may be used. Additional variations within the scope of this invention will be apparent to those familiar with this art.

The effects of the homogenization treatment are related to tin concentration in that increases in tin content beyond 0.12% do not result in increases in anode current for samples homogenized by the reference treatment. However, for these same samples there is a distinct increase in the total weight loss. This latter increase indicates that a substantial decrease in anodic efficiency occurs when the samples of high tin content are fully homogenized as by the reference treatment.

Since the specimens containing more than 0.1% tin are subject to much more uniform attack than those containing less than this tin concentration, it will be evident that the preferred range of tin concentration which best balances the opposing influences on good performance in marine sacrificial anode applications, is between 0.10 and 0.15% tin, with a large portion of this percentage in the solid solute state, as based on the above testing procedures.

As a further illustration of the varied thermal treatments which can be employed in obtaining different galvanic and other properties in alloys containing aluminum and tin as the essential galvanically active ingredients thereof, portions of a number of the metal specimens prepared above were further treated by mechanical and thermal means.

Each portion or block was first homogenized as described above and cooled in air. It was then milled to a block 3 inches by 3 inches by 0.85 inch. This block was cold rolled to reductions of between 30 and 40% until a final thickness of 0.060 inch was reached. Between each such rolling the specimen was given an intermediate anneal of 500° C. for one hour and the final rolling was followed by a final heat treatment. This last treatment consisted of either solution heat treating for eight hours at 620° C. and water quenching, or solution heat treating followed by a precipitation heat treatment at 400° C. for 24 hours and water quenching. This combination of solution and precipitation heat treatment followed by quenching is one of many possible heterogenizing treatments.

Although heterogenizing can be carried out at other temperatures, for example 300 or 500° C., and although longer or shorter times of heating may be employed (generally in inverse relation to the temperature of heating), the above combination of temperature and time is effective in removing much tin from solid solution and is the procedure referred to by the term heterogenizing as used hereinafter unless some indication is given to the contrary. There is no detectable loss of tin from use of this heterogenization treatment.

Sheet specimens were rolled in this manner from ingots 839–843 and 6031. Ingots 839 and 840 contained 0.02 and 0.04% tin respectively and were prepared substantially as described in Example I above. The results obtained from tests of galvanic properties of specimens of these sheets which were given a reference homogenization are shown in FIGURES 11 and 12.

Figure 11:
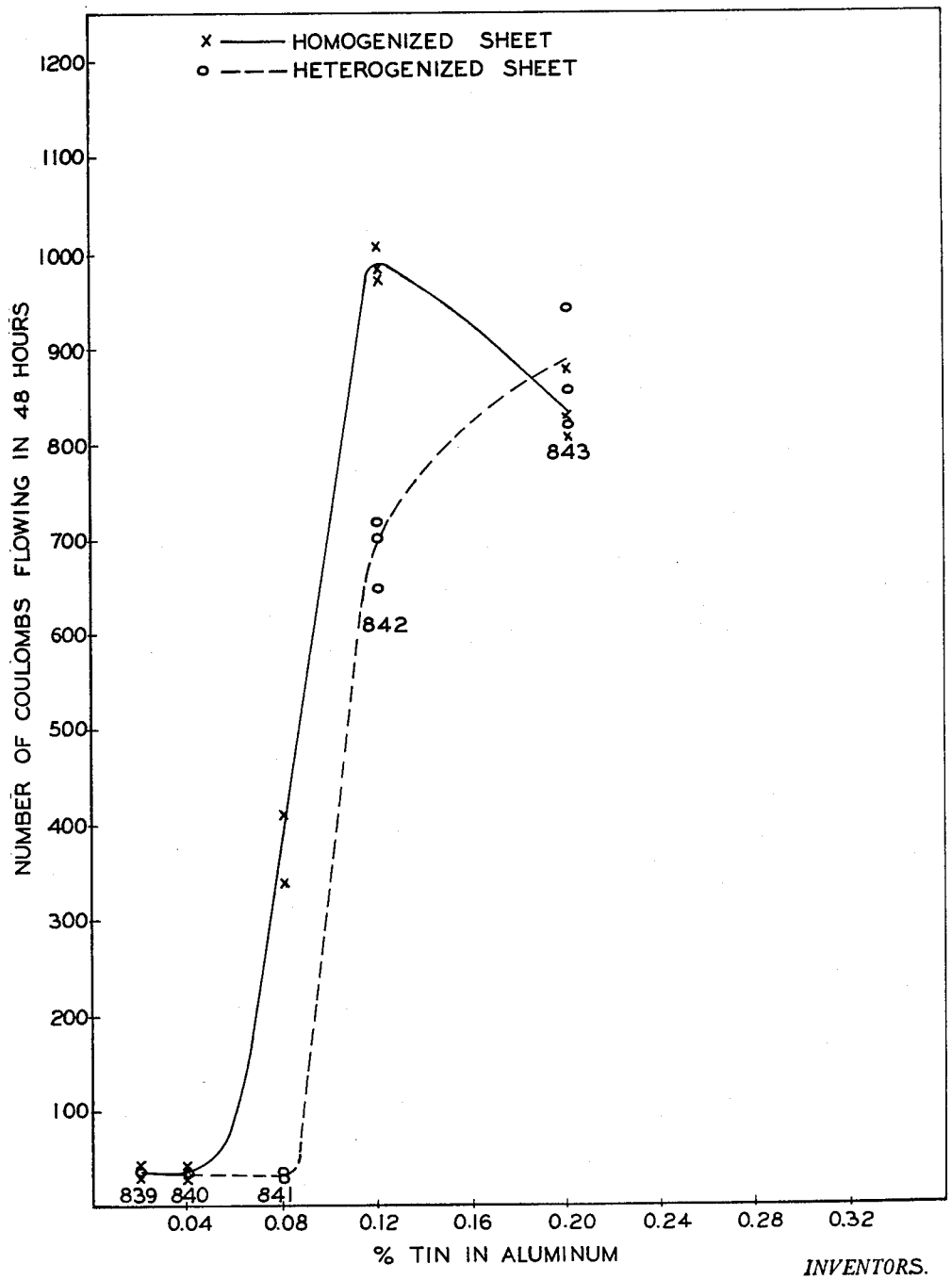
FIGURE 11 is a graph similar to FIGURE 1 showing the relationship between the number of coulombs flowing in 48 hours and the tin content of alloy which had been converted to sheet form.
Figure 12:
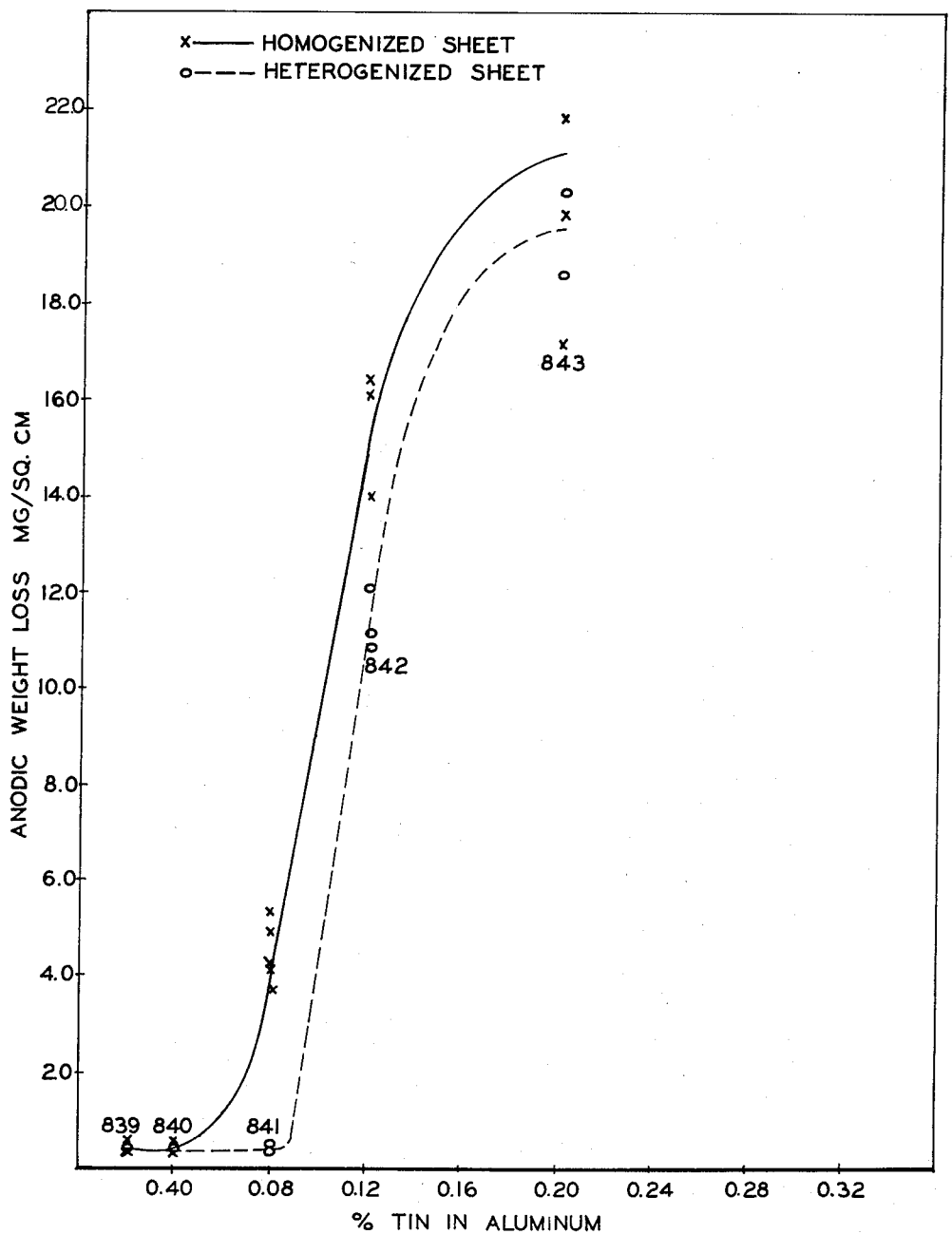
FIGURE 12 is a similar graph showing anodic weight loss plotted against alloy tin content for the sheet form of the aluminum-tin alloy.

As is evident the principal difference in results obtained between the sheet specimens of FIGURE 11 and the cast-homogenized specimens of FIGURE 2 is a sharp drop in coulombs delivered between 0.12 and 0.20% tin. It was also found that the anodic efficiency is significantly lowered by this conversion to sheet form followed by reference homogenization when compared to the cast-homogenized specimens. Further the galvanic corrosion of homogenized sheet tended to be less uniform than that of cast-homogenized specimens under similar conditions. A pronounced corrosion, banded parallel to the rolling direction, was observed. The results thus obtained for homogenized sheet, formed a basis also for comparison of the results of the heterogenization treatment of specimens of alloy in sheet form.

Similar sheet specimens from ingots 839–843 were subject to the precipitation (or heterogenizing) treatment indicated above, i.e., heating at 400° C. for 24 hours followed by water quench. The results of this treatment are also shown in FIGURES 11 and 12. From these figures it is evident that this heterogenizing treatment is effective in eliminating the beneficial effects of tin on galvanic corrosion characteristics only up to 0.08%. At a tin content of 0.12%, galvanic currents are slightly reduced by this treatment and at a content of 0.20%, no significant effect is produced. These results further evidence the great stability of the galvanic corrosion characteristics in the range 0.1 to 0.2% tin and that the decomposition of the metastable solid solution on long term aging at room temperature will not occur.

The micro-structures of the sheet specimens both in the homogenized and heterogenized conditions were studied metallographically. It was observed that a higher degree of soundness and homogeneity of structure is achieved by the combination of mechanical working and thermal treatment. The more effective quench possible on the 0.060 inch thick sheet (as compared to sections of more than one inch thickness) does not favorably influence galvanic corrosion characteristics.

Microstructure examination of the heterogenized sheet showed that an appreciable amount of second phase is produced in alloys containing 0.04% tin or more. Heterogenizing alloys with higher tin contents also result in the presence of additional precipitation but as indicated above is not marked by such large changes in galvanic corrosion characteristics as are found in the alloys of lower tin content. This study of the results of heterogenizing heat treatment points to a remarkable stability in the galvanic corrosion properties of alloys which contain higher percentages of tin, in excess of about 0.12%, and which have been homogenized. Thus although the heterogenizing effects a definite increase in the amount of tin in the second phase, this is not attended by a similar change in galvanic corrosion properties.

A solution of 0.1 N NaCl contains about 0.58% NaCl. The concentration of NaCl in sea water is closer to 3%. It should be appreciated that the anodic current values given herein are for the 0.58% NaCl and that the current values are increased by a factor of about 2.5 when the same determinations are made in 3% NaCl.

From the foregoing it will be evident that in one of its narrower aspects an aluminum-tin sacrificial anode composition and method of forming the composition are provided by this invention and this composition is technically superior to existing sacrificial anode compositions such as magnesium and zinc anodes. This superiority is possible for the aluminum-tin composition of this invention because of its great versatility in providing different combinations of galvanic properties. With particular reference to sacrificial anodes for marine use, in order for the aluminum-tin compositions to be technically superior to other compositions useful for this purpose the composition and processing must be adjusted so that this alloy composition has the following performance characteristics:

(1) A high galvanic current similar to those obtained from magnesium anodes must result when the anode is coupled to steel in low resistance electrolytes.

(2) The galvanic corrosion of the anode itself must be fairly uniform so that premature disintegration due to localized attack is avoided.

(3) A high ampere hour per pound output should be secured. Aluminum has a considerable advantage here because its equivalent weight is lower than that of magnesium and zinc. Highest values of ampere hours per pound are obtained by the use of aluminum alloy anodes only if the anode efficiency is good.

It has been found that in all galvanic corrosion tests carried out the steel cathodes were completely cathodically protected against corrosion. Although affording complete protection it will be appreciated that differences may exist as in the cost and efficiency of such protection and it is in these respects that the present invention is deemed to be particularly advantageous.

With regard to sacrificial anode applications, in summary it has been found that the as-cast material produces a high current and has good anode efficiency where the tin content is between 0.08 and 0.30%, and that the as-cast ingot corrodes uniformly when the tin content is about 0.15% or above.

Similarly for the homogenized material, high anode currents and high efficiencies are obtained when the tin content is between 0.08 and 0.15%. Further the homogenized ingots are not subject at all to intergranular corrosion and they corrode uniformly when the tin content is above 0.1%. In general an Al-Sn alloy having a tin compositional range of 0.10 to 0.15% and homogenized to a degree approximately equivalent to that described above will fulfill the above criteria with great reliability on a large scale. Such a material has long term stability even though the tin is in metastable solid solution to a high degree.

While the foregoing description is directed particularly to the improved galvanic properties of aluminum-tin alloys and the sacrificial anode uses which can be made of these alloys, it will be appreciated that numerous other compositions as well as uses of the compositions of this invention can be made and that one of the unique features of this invention is that a very broad adjustment may be made in the physical, electrical and mechanical properties of the compositions by adjustments either in the ingredients thereof or in the thermal treatments of the composition or in both.

For example, because of the lowered specific resistance of the surface film and the high conductivity of the alloy, the composition can find many applications in the electrical conductor, connector and electrical contactor field. The film resistance can be varied by varying the tin content of the alloy, particularly that in solid solution in the alloy.

Further it has been found that the tinning of aluminum can be accomplished with greater ease than it can for most other alloys of aluminum. Thus where two samples having about the same dimensions, one a specimen containing 0.20% tin in aluminum and prepared in accordance with this invention, and the other a specimen of 1100–H14 aluminum alloy, were coated with a flux composition having a $BF_3$ base, the same quantity of metal containing 44% Sn, 25% tin and 30% Cd was placed on each of the specimens, and the specimens were heated to a uniform tinning temperature, the metal on the 1100 sample spread to a diameter of about 1.5 inches whereas that on the Al-Sn composition of this invention spread to a diameter of about 3.0 inches.

In a second test similar metal specimens were coated with a flux having a $ZnCl_2$ base and then heated to the same tinning temperature while a portion of a metal composition containing 60% Sn and 40% Zn was supported on each specimen. The spot on the 1100 alloy developed a spot having dimensions of about 2 inches by 2.5 inches. The specimen of Al-Sn alloy prepared in accordance with this invention became completely coated on one side (a three-inch square).

Further tests conducted in forming T joints with specimens of the above metal in sheet form, and the above flux and alloys, by adding alloy metal to one side of the fluxed T demonstrated that under the same conditions the flow of metal to form full symmetrical fillets in both angles of the T was much more pronounced on the Al-Sn alloy than on the 1100 alloy. The greater ease of tinning the Al-Sn alloy was further confirmed by heating the alloy in contact with Eutectic Tinweld #4, a tin powder in slightly HCl acidified rosin, and by heating in contact with Eutectic Tinweld #1, a powder of 50% Sn and 50% Pb in rosin which was more highly acidified with HCl. These flux solder pastes are used for tinning of copper and other readily solderable metals and generally are quite ineffective in tinning 1100. The Al-Sn alloy specimens were, however, readily tinned by both of these Tinweld compositions whereas the 1100 was not.

While the improved tinning results indicated above were achievable with 0.20% tin in aluminum, it will be understood that the improved results are achievable at other tin concentrations and that the higher tin content favors the improved tinning of the Al-Sn alloy compositions of this invention.

The use of alloys prepared as described in the examples above, which have high conductivity, low resistance coating, and improved ease of tinning have many applications in the electrical, electronic and related fields. Such tin alloys containing a quantity of tin below that at which an appreciable reduction in conductivity occurs are contemplated as within the scope of the present invention. The excess tin, above that in solid solution, was observed to be beneficial in tinning in that small adherent beads of metal form at the metal surface during the heating step of the tinning process.

The alloy compositions of the present invention are also useful in protecting other aluminum alloys from corrosion. For example, premium corrosion resistance is afforded to many aluminum alloys such as 6061, 3003, 5052, etc. by cladding with thin, rolled-on layers of an alloy such as 7072 containing 1% Zn. However, 7072 is not invariably effective in cathodically protecting aluminum alloys containing much magnesium (such as 5086, 5056, etc.), nor is 7072 invariably effective in protecting 6061 in hot supply waters. The alloys of the present invention are more electronegative than 7072 and may be tailored to provide effective cathodic protection in the form of rolled-on cladding in applications where 7072 does not perform in a satisfactory fashion. Generally, a relatively low tin content, below 0.08%, is required for such purposes. Such protective layers may be joined to the core metal to be protected by conventional metallurgical practices as by high temperature rolling and the like.

Numerous other applications can be made of the compositions of this invention to make use of their unique galvanic cell applications. For example, in dry cell applications it may be desirable to duplicate the electrochemical characteristics of zinc and for such purpose a much lower current output will be desired. Pursuant to this invention, such a lower current is achieved by use of a lower tin content. In this regard, it is seen from FIG- URE 1 that galvanic current rises sharply with tin content between 0.04 and 0.08% Sn. By application of thermal treatments, as taught above, fairly constant current output over a wide compositional (Sn) range may be obtained. In order to simultaneously produce uniform corrosion of the metal specimen, ternary elements may be added to form secondary cathode inclusions. A lower current alloy composition suitable for dry cell utilization may be produced in this way. Ternary additives, such as Cd, Bi, or Pb may be used for this purpose in that they are metallic conductors, are essentially insoluble in aluminum, and exhibit a relatively low hydrogen overpotential.

Alternatively additive elements capable of forming a stable compound with aluminum such as $Fe(FeAl_3)$, $Cr(CrAl_7)$, and $Mn(MnAl_6)$ may be used for this purpose. These additive elements must be in essential accordance with the formula for secondary cathode particulate additives as given above and are found to promote the uniform corrosion attributable to the secondary cathode particles.

Substantially all of the determinations of galvanic properties which are given above are based on a testing procedure which was designed to give a high degree of reliability and reproducibility. As indicated the testing procedure is essentially that described in the article Journal of the Electrochemical Society 105, 629, 1958. The values which result from a measurement or test are dependent on the particular testing procedure used, of course, and different values from those given above will result from either different testing or from different actual use conditions. However, in general, the results obtained will be in line with those given above particularly on a comparative basis.

One illustration of the changes in test values obtained from use of different testing procedures is indicated by the results of carrying out measurements of galvanic current and of current efficiency for ingot specimens using a 2000 ml. electrolyte both containing 0.1 N NaCl at 20° C. in place of the 100 ml. bath used in making the measurements included above. The change is not simply in the volume of electrolyte because a secondary effect of this change is to do away with an increase of pH to above values normally encountered in sea water. In particular the pH of the electrolyte in the 100 ml. test bath usually rose from an initial value of about 6 to final values of up to 10.5 during a test whereas in the 2000 ml. bath, and in sea water, the pH normally does not rise to 9. The difference between the galvanic current produced and the efficiency are given in Table II below.

TABLE II

| Ingot No. | Percent tin | Coulombs delivered in 48 hours | | Anodic efficiency, percent | |
|---|---|---|---|---|---|
| | | In 100 ml. | In 2,000 ml. | 100 ml. | 2,000 ml. |
| 6030 | .12 | 850 | 1,490 | 59 | 59 |
| 6032 | .18 | 1,000 | 2,015 | 45 | 43 |
| 843 | .20 | 1,020 | 1,890 | 40 | 41 |

From this table it is evident that the number of coulombs delivered in 48 hours is nearly doubled by an increase in the volume of electrolyte in which the determination is made such that the pH does not rise above the value normally found in sea water. Further, this increase in coulombs delivered is achieved with no appreciable reduction in anodic efficiency.

Many other changes can be made in the conditions and variables discussed above without departing from the scope of this invention. As a further example, although the description of the range of tin content, as discussed above, is directed principally to concentrations below 0.30% because this is the most effective range for the purity of base metal ued and the applications referred to, it will be appreciated that valuable improvements in galvanic and other properties, as also discussed above, are achieved at tin concentrations in excess of the 0.30% value and that such compositions having the improved properties discovered are within the scope of this invention.

Since many examples of the foregoing procedures and compositions may be carried out and made, and since many modifications can be made in the procedures and compositions decribed without departing from the scope of the subject invention, the foregoing is to be interpreted as illustrative only, and not as defining or limiting the scope of the invention.

What is claimed is the following:

1. An aluminum base alloy consisting essentially of from 0.08 to 0.3 percent by weight of tin, with the tin being retained in solid solution to the maximum degree at room temperature, said maximum degree being 0.1 percent, and the remainder aluminum.

2. An aluminum base alloy consisting essentially of from 0.1 to 0.3 percent by weight of tin, with 0.1 percent by weight of tin being retained in solid solution at room temperature and the remainder aluminum.

3. An aluminum base alloy consisting essentially of from 0.1 to 0.3 percent by weight of tin, with 0.1 percent by weight of tin being retained in solid solution at room temperature, a second phase, finely divided, uniformly distributed conductive material, and the remainder aluminum.

4. An alloy according to claim 3 wherein said second phase material is selected from the group consisting of titanium carbide, titanium nitride, titanium boride, zirconium nitride, zirconium carbide, zirconium boride, elemental bismuth, elemental lead and a noble metal.

5. An aluminum base alloy consisting essentially of from 0.1 to 0.3 percent by weight of tin, with 0.1 percent by weight of tin being retained in solid solution at room temperature, a halide anion, and the remainder aluminum.

References Cited by the Examiner

UNITED STATES PATENTS

| 1,997,165 | 4/35 | Brown | 75—138 |
| 2,288,995 | 7/42 | De Long | 148—6.27 |
| 2,311,644 | 2/43 | Darby et al. | 204—148 |
| 2,565,544 | 8/51 | Brown | 204—148 |
| 2,641,622 | 6/53 | Higgens et al. | 136—120 |
| 2,711,974 | 6/55 | Happe | 148—6.27 |
| 2,719,253 | 9/55 | Willardson et al. | 75—138 |
| 2,796,456 | 6/57 | Stokes | 136—120 |
| 2,820,693 | 1/58 | Hervert et al. | 204—148 |
| 2,852,367 | 9/58 | Goetzel et al. | 75—138 |
| 2,885,286 | 5/59 | Weber | 75—138 |
| 2,886,432 | 5/59 | Schmitt et al. | 75—138 |
| 2,895,893 | 7/59 | Robinson | 204—197 |
| 2,913,384 | 11/59 | Staley | 204—148 |
| 2,931,722 | 4/60 | Urban | 75—138 |
| 2,939,785 | 6/60 | Weatherly et al. | 75—138 |
| 3,013,193 | 12/61 | Gorton et al. | 75—138 |
| 3,037,857 | 6/62 | Conant | 75—138 |
| 3,063,832 | 11/62 | Snyder | 75—138 |

FOREIGN PATENTS 132,984  10/19  Great Britain.

OTHER REFERENCES

Hansen: Constitution of Binary Alloys, 1958, pages 135 and 136. Published by McGraw-Hill Co., Inc. New York, N.Y.

DAVID L. RECK, Primary Examiner.

JOHN R. SPECK, Examiner.

UNITED STATES PATENT OFFICE
CERTIFICATE OF CORRECTION

Patent No. 3,180,728                                                    April 27, 1965

Michael J. Pryor et al.

It is hereby certified that error appears in the above numbered patent requiring correction and that the said Letters Patent should read as corrected below.

Column 3, line 29, for "pin" read -- tin --; same column 3, TABLE I, second column, line 4 thereof, for "Approx. 90)" read -- Approx. 900 --; column 6, lines 33 and 34, for "statically" read -- statistically --; column 7, line 55, for "solvent pulverulent" read -- solid pulverent --; column 8, line 34, after "will" insert -- be --; column 14, line 38, for "aluminum-in" read -- aluminum-tin --; column 15, line 31, for "thin" read -- tin --; column 18, line 32, for "mold" read -- fold --; column 21, line 1, after "and" insert -- that --; column 24, line 2, for "ued" read -- used --.

(SEAL)      Signed and sealed this 28th day of December 1965.

Attest:

ERNEST W. SWIDER                                              EDWARD J. BRENNER
Attesting Officer                                                            Commissioner of Patents